United States Patent
Park et al.

(10) Patent No.: US 11,018,828 B2
(45) Date of Patent: May 25, 2021

(54) UPLINK MIMO REFERENCE SIGNALS AND DATA TRANSMISSION SCHEMES

(71) Applicant: QUALCOMM Incorporated, San Diego, CA (US)

(72) Inventors: Seyong Park, San Diego, CA (US); Wanshi Chen, San Diego, CA (US); Wei Zeng, San Diego, CA (US); Alexandros Manolakos, San Diego, CA (US); Hao Xu, Beijing (CN); Renqiu Wang, San Diego, CA (US); Yi Huang, San Diego, CA (US); Peter Gaal, San Diego, CA (US); Naga Bhushan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 12 days.

(21) Appl. No.: 15/713,270

(22) Filed: Sep. 22, 2017

(65) Prior Publication Data

US 2018/0227101 A1    Aug. 9, 2018

Related U.S. Application Data

(60) Provisional application No. 62/455,558, filed on Feb. 6, 2017.

(51) Int. Cl.
*H04L 5/00* (2006.01)
*H04W 52/18* (2009.01)
(Continued)

(52) U.S. Cl.
CPC ............ *H04L 5/0051* (2013.01); *H04L 5/005* (2013.01); *H04L 5/0023* (2013.01);
(Continued)

(58) Field of Classification Search
CPC . H04L 27/26; H04L 27/2607; H04L 27/2613; H04L 27/2636; H04L 5/0023;
(Continued)

(56) References Cited

U.S. PATENT DOCUMENTS

2010/0303034 A1    12/2010   Chen et al.
2013/0194931 A1*   8/2013    Lee .................. H04L 5/0053
                                                     370/241
(Continued)

FOREIGN PATENT DOCUMENTS

| EP | 2262307 A1 | 12/2010 |
| EP | 2584810 A1 | 4/2013 |
| WO | 2013153269 A1 | 10/2013 |

OTHER PUBLICATIONS

International Search Report and Written Opinion—PCT/US2018/015409—ISA/EPO—dated May 16, 2018.

*Primary Examiner* — Wayne H Cai
(74) *Attorney, Agent, or Firm* — Patterson & Sheridan, L.L.P

(57) ABSTRACT

Certain aspects of the present disclosure relate to methods and apparatus for Uplink MIMO reference signals and data transmission schemes communications systems operating according to 5G technologies. For example, one or more techniques for enabling PRG selection and conveying that selection are provided. In some cases, precoder selection techniques may be provided. Further, in some cases, techniques may be provided to distinguish OFDM and DFT-s-OFDM by using different ports.

33 Claims, 29 Drawing Sheets

(51) Int. Cl.
*H04L 27/26* (2006.01)
*H04W 72/04* (2009.01)
*H04W 52/36* (2009.01)

(52) U.S. Cl.
CPC ........ *H04L 5/0091* (2013.01); *H04L 27/2613* (2013.01); *H04W 52/18* (2013.01); *H04W 72/0413* (2013.01); *H04L 5/0016* (2013.01); *H04L 27/2607* (2013.01); *H04L 27/2636* (2013.01); *H04W 52/365* (2013.01)

(58) Field of Classification Search
CPC ..... H04L 5/0091; H04L 5/005; H04L 5/0051; H04L 5/0016; H04W 52/365; H04W 72/0413; H04W 52/18
See application file for complete search history.

(56) References Cited

U.S. PATENT DOCUMENTS

| | | | | |
|---|---|---|---|---|
| 2013/0322349 | A1* | 12/2013 | Hosangadi | H04L 1/0005 370/329 |
| 2016/0277065 | A1* | 9/2016 | Xie | H04B 1/7143 |
| 2016/0301547 | A1* | 10/2016 | Iwai | H04W 2/0453 |
| 2016/0323025 | A1* | 11/2016 | Liu | H04B 7/0478 |
| 2019/0190572 | A1* | 6/2019 | Osawa | H04W 72/042 |

\* cited by examiner

UPLINK MIMO REFERENCE SIGNALS AND DATA TRANSMISSION SCHEMES

CLAIM OF PRIORITY UNDER 35 U.S.C. § 119

The present application for patent claims benefit of U.S. Provisional Patent Application Ser. No. 62/455,558, filed Feb. 6, 2017, assigned to the assignee hereof and hereby expressly incorporated by reference herein.

BACKGROUND

Field of the Disclosure

The present disclosure relates generally to communication systems, and more particularly, to methods and apparatus for Uplink MIMO reference signals and data transmission schemes communications systems operating according to 5G technologies.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in 5G technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Devices in a wireless network may communicate using SRS transmissions. In some cases, SRS may be precoded differently for different subbands, and different precoders may use a different physical resource group (PRG) selection of the SRS allocated bandwidth. However, precoder selection can be challenging. Also, defining techniques for determining a PRG selection for SRS transmission can be challenging. In some cases, both OFDM and DFT-s-OFDM waveforms may be supported in uplink. However, the precoder matrix, Tx power scaling factor, and/or modulated coding scheme (MCS) for OFDM and DFT-s-OFDM may be different.

Thus, aspects of the present disclosure present techniques for enabling PRG selection and conveying that selection. In some cases, precoder selection techniques may be provided. Further, in some cases, techniques may be provided to distinguish OFDM and DFT-s-OFDM by using different ports.

Certain aspects provide a method for wireless communication by a user equipment (UE). The method generally includes determining a physical resource block group (PRG) size for the UE to use for sounding reference signal (SRS) transmission, wherein the SRS transmission is allocated over a bandwidth including a plurality of PRGs, and transmitting the SRS transmission to a base station (BS) in accordance with the determination, wherein at least two of the plurality of PRGs have different precoding.

Certain aspects provide a method for wireless communication by a base station. The method generally includes determining a physical resource block group (PRG) size for a user equipment (UE) to use for sounding reference signal (SRS) transmission, and receiving an SRS transmitted from the UE in accordance with the determination.

Certain aspects provide a method for wireless communication by an apparatus. The method generally includes precoding a first sequence for a sounding reference signal (SRS) transmission on a first subband resource using a first precoder, precoding a second sequence for the sounding reference signal (SRS) transmission on a second subband resource using a second precoder, transmitting the first precoded sequence of the reference signal SRS transmission on the first subband resource in a first transmission time interval, and transmitting the second precoded sequence of the reference signal SRS transmission on the second subband resource in a second transmission time interval.

Certain aspects provide a method for wireless communication by an apparatus. The method generally includes receiving a first portion of a reference signal an SRS transmission from a user equipment (UE)transmitting apparatus on a first subband resource in a first transmission time interval, wherein the first portion was precoded by the UE transmitting apparatus using a first precoder, receiving a second portion of the reference signal SRS transmission from the UE transmitting apparatus on a second subband resource in a second transmission time interval, wherein the second portion was precoded by the UE transmitting apparatus using a second precoder, and processing the first portion and the second portions of the reference signal SRS transmission based on the first precoder and the second precoders.

Certain aspects provide a method for wireless communication by a user equipment. The method generally includes determining whether an uplink transmission is to be sent as a DFT spread orthogonal frequency division multiplexed (DFT-s-OFDM) signal, and select one or more ports for sending the uplink transmission based on the determination.

Certain aspects provide a method for wireless communication by a base station. The method generally includes determining, based on one or more ports used by a user equipment (UE) for sending an uplink transmission, whether the uplink transmission was sent as a DFT spread orthogonal frequency division multiplexed (DFT-s-OFDM) signal, and processing the uplink transmission based on the determination.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
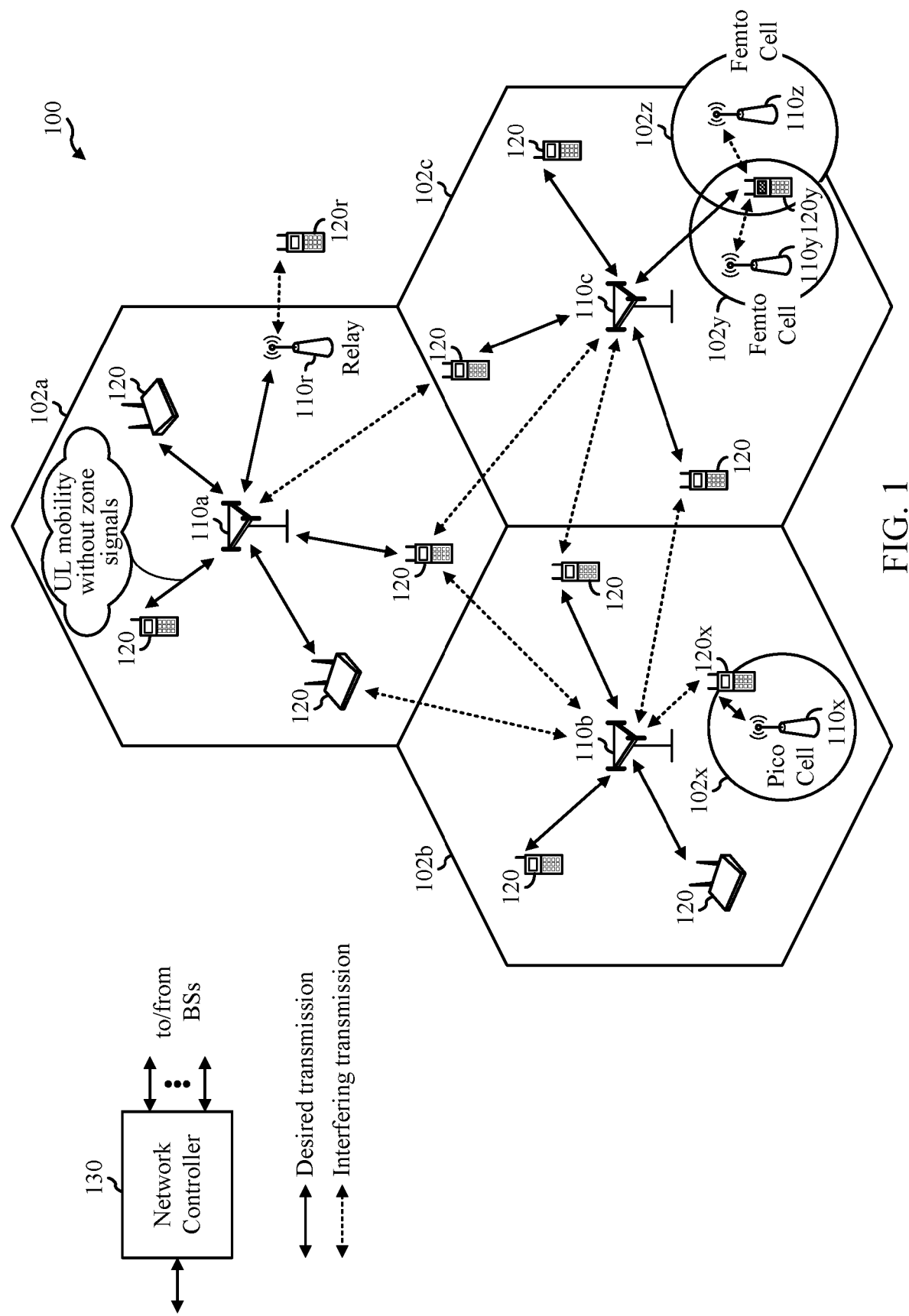
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technologies or 5G technologies).

5G may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In 5G systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as 5G. 5G may utilize OFDM with a CP on the uplink and downlink and include support for half-duplex operation using time division duplex (TDD). A single component carrier bandwidth of 100 MHz may be supported. 5G resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for 5G may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based. 5G networks may include entities such CUs and/or DUs.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A 5G BS (e.g., eNB, 5G Node B, Node B, transmission reception point (TRP), access point (AP)) may correspond to one or multiple BSs. 5G cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. 5G BSs may transmit downlink signals to UEs indicating the cell type. Based on the cell type indication, the UE may communicate with the 5G BS. For example, the UE may determine 5G BSs to consider for cell selection, access, handover, and/or measurement based on the indicated cell type.

Figure 2:
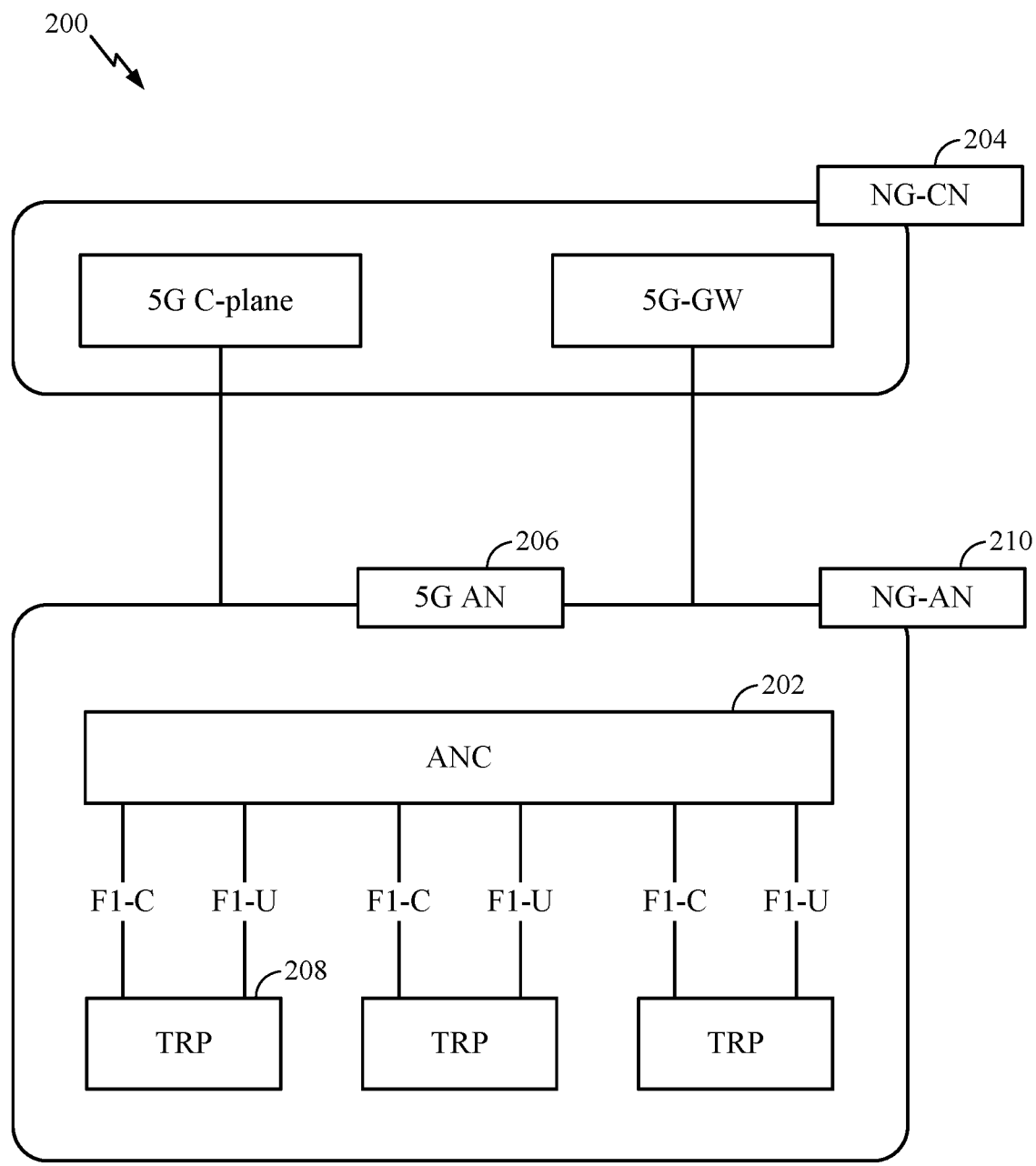
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with 5G. The NG-AN may share a common fronthaul for LTE and 5G.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
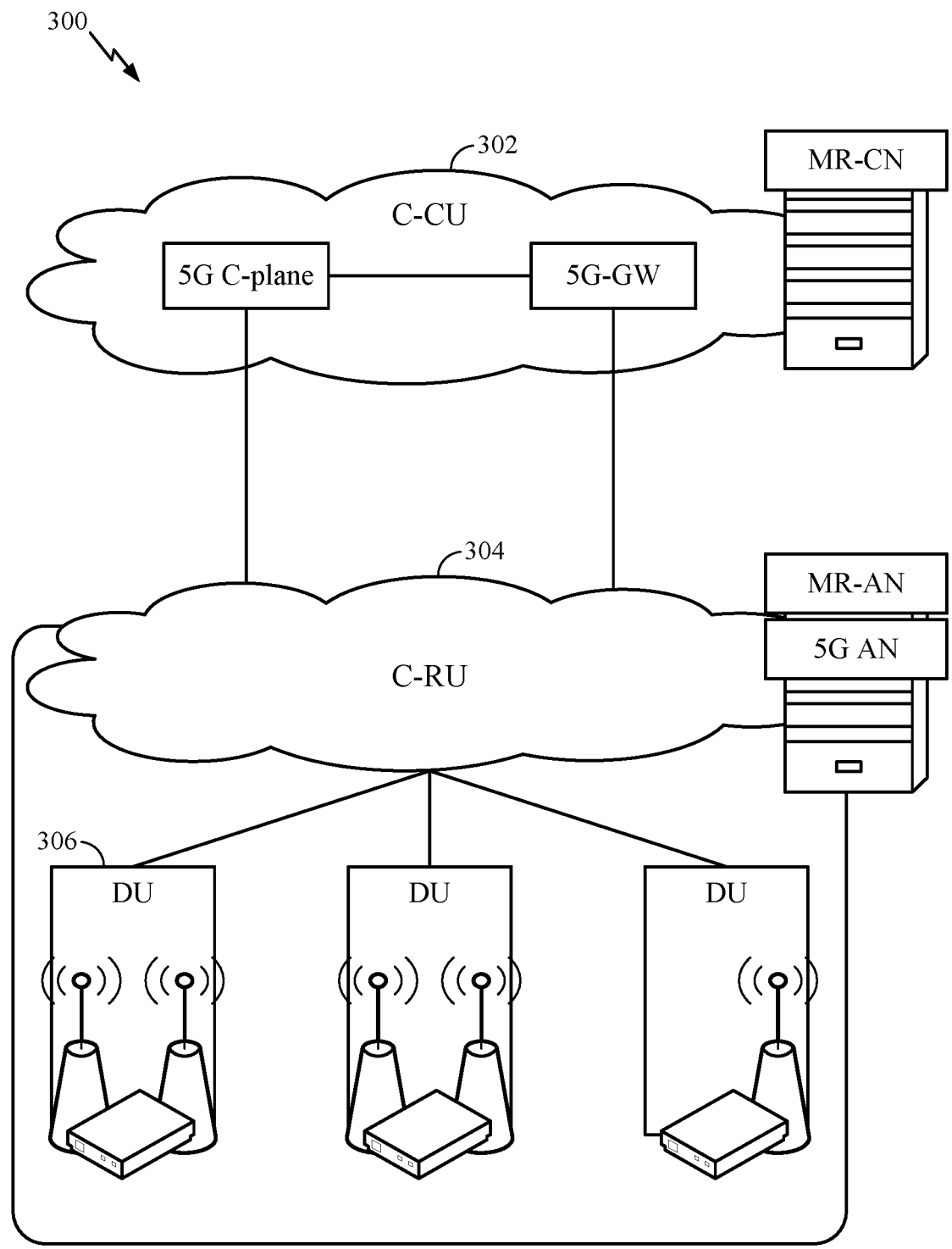
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
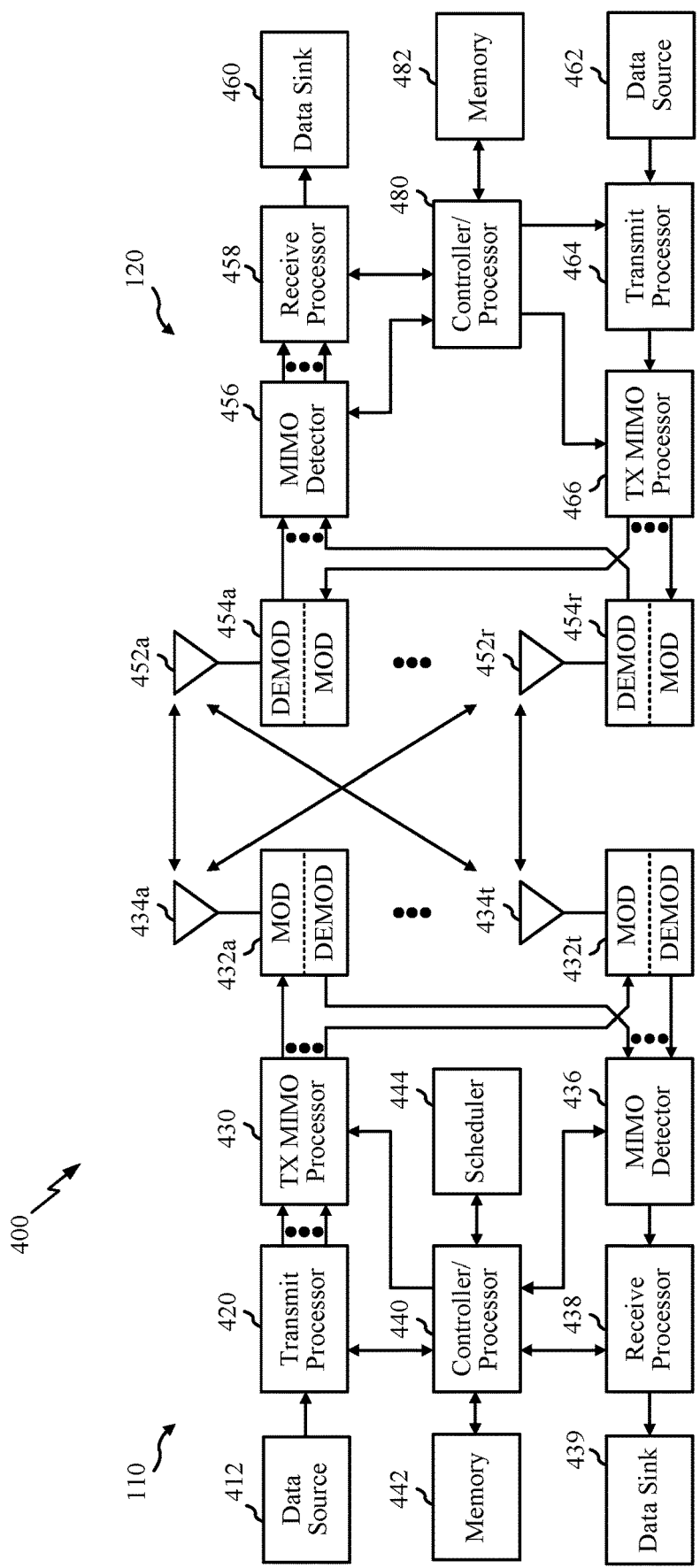
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that the CoMP aspects reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
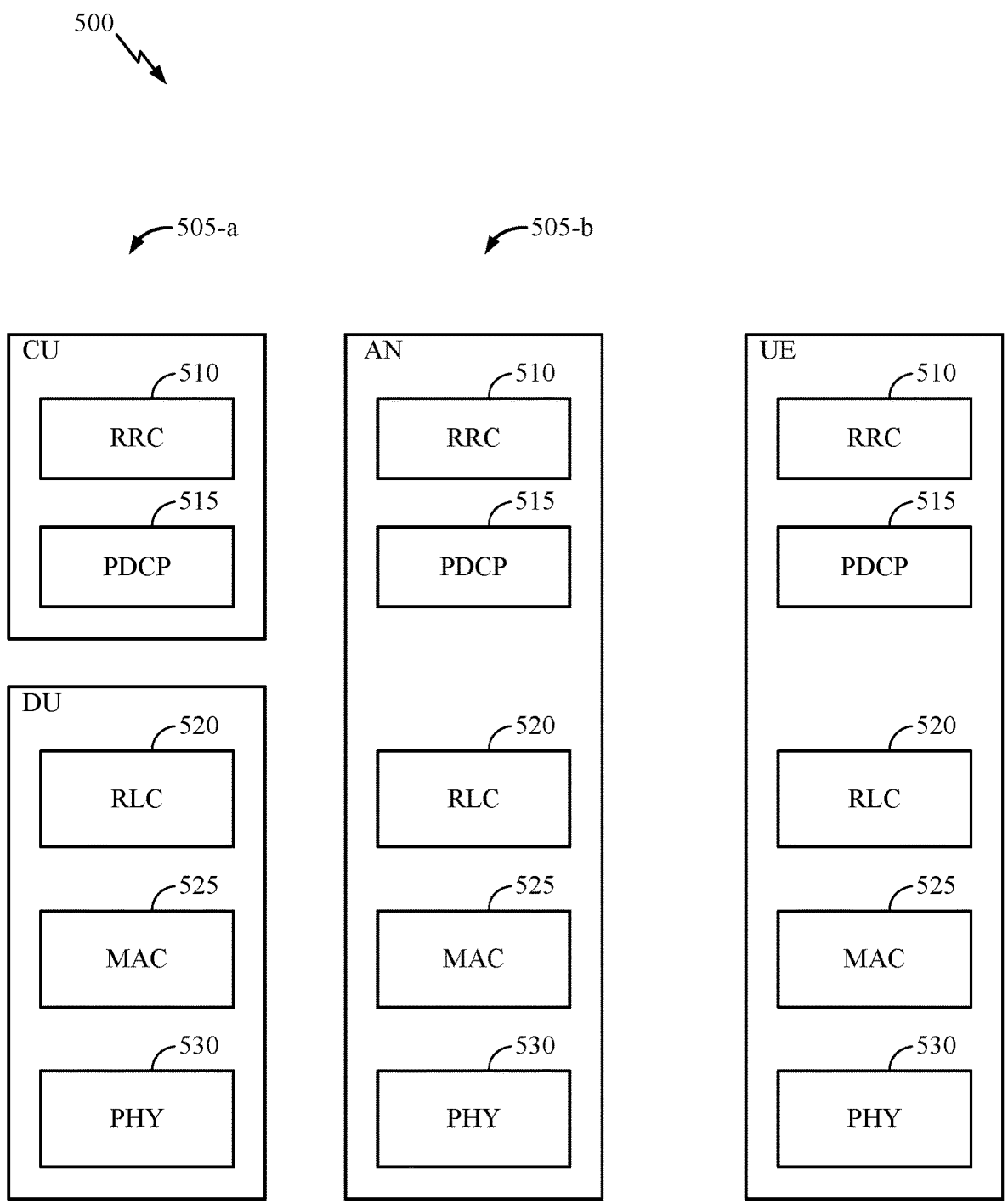
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
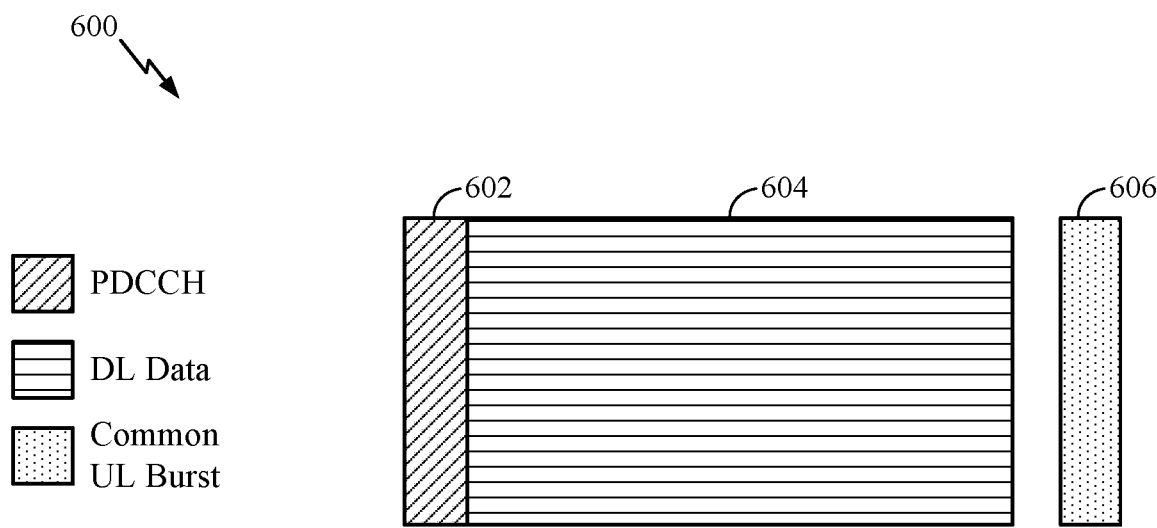
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
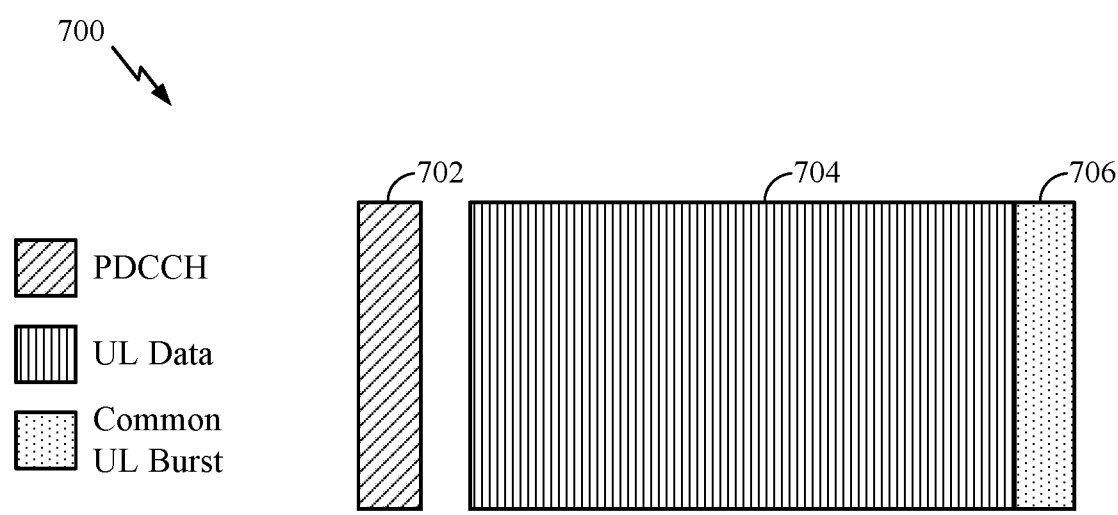
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Physical Resource Block Group Size Selection for Srs Transmission

Figure 8:
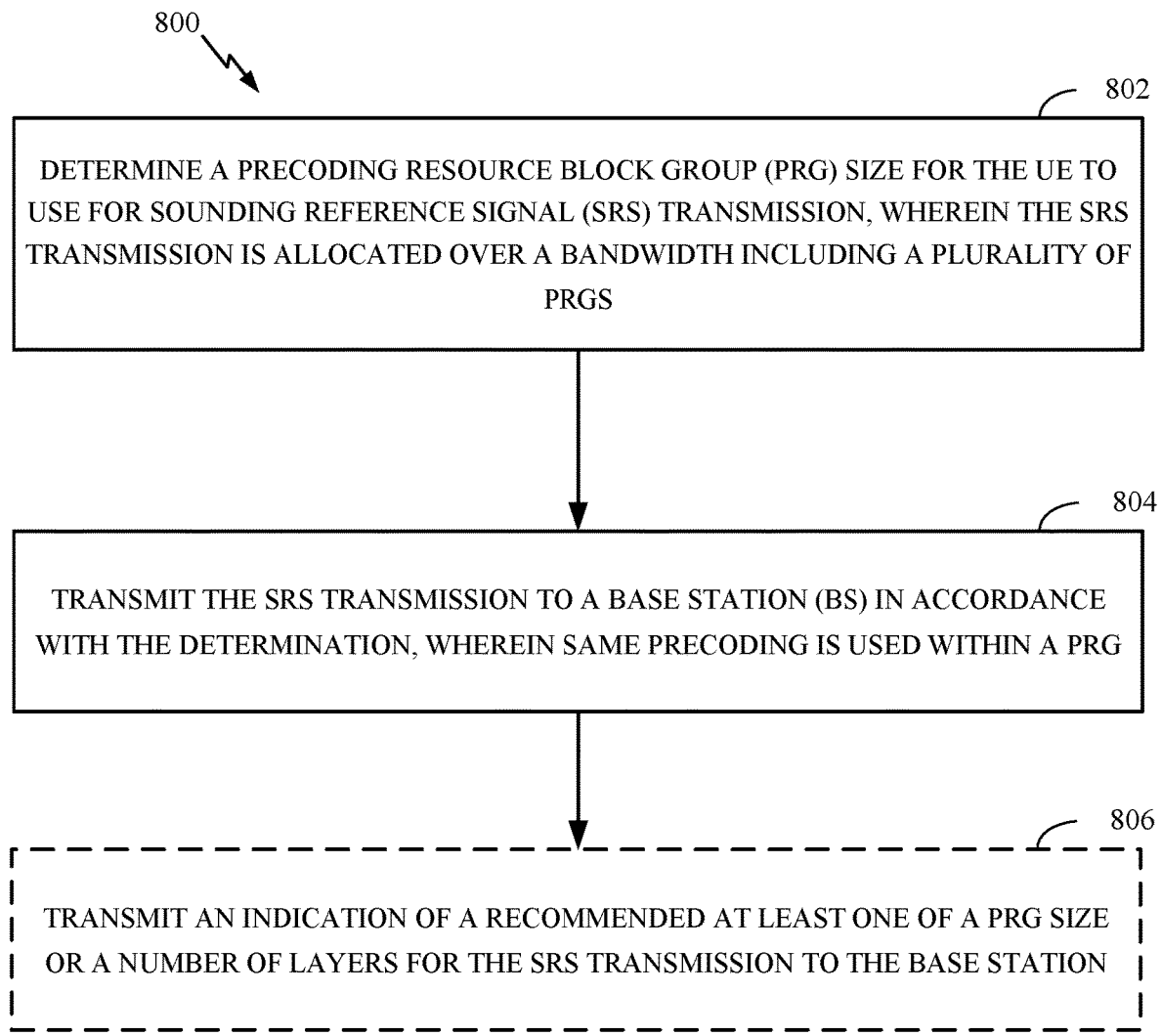
FIG. 8 illustrates example operations for wireless communications by a UE, in accordance with aspects of the present disclosure.

FIG. 8 illustrates example operations for wireless communications by a UE, in accordance with aspects of the present disclosure.

Operations 800 begin, at block 802, with the UE determining a physical resource block group (PRG) size for the UE to use for sounding reference signal (SRS) transmission, wherein the SRS transmission is allocated over a bandwidth including a plurality of PRGs. In one or more cases the determination may be based on signaling from the base station. In other cases, the determination may be based a number of ports used for the SRS transmission. The PRG size may correspond to a whole operating bandwidth if the number of layers is below a predetermined number. In one example, the predetermined number is 4. In one or more cases the determination may be based on power headroom of the UE. According to one or more other aspects the PRG size may correspond to a whole operating bandwidth if the UE is transmitting at full power such that there is no longer any UE power headroom available. The PRG size or a number of layers for the SRS transmission may be reused for the downlink. For example, the PRG size or a number of layers for the SRS transmission may be used for transmitting one or more downlink reference signals from the BS to the UE.

The UE may also include, at block 804, transmitting the SRS transmission to a base station (BS) in accordance with the determination, wherein same precoding is used within a PRG. For example, the UE may transmit the SRS to a base station based on the PRG size determined in a preceding operation. As shown at 806, the method may optionally also include transmitting an indication of a recommended at least one of PRG size or a number of layers for the SRS transmission to the base station. Providing the indication to the BS helps inform the BS of the determination made by the UE regarding, for example, a determined PRG size. Having the indication may therefore help the BS process that which is transmitted to the BS from the UE in the form of an SRS transmission based on the determination.

Figure 8A:
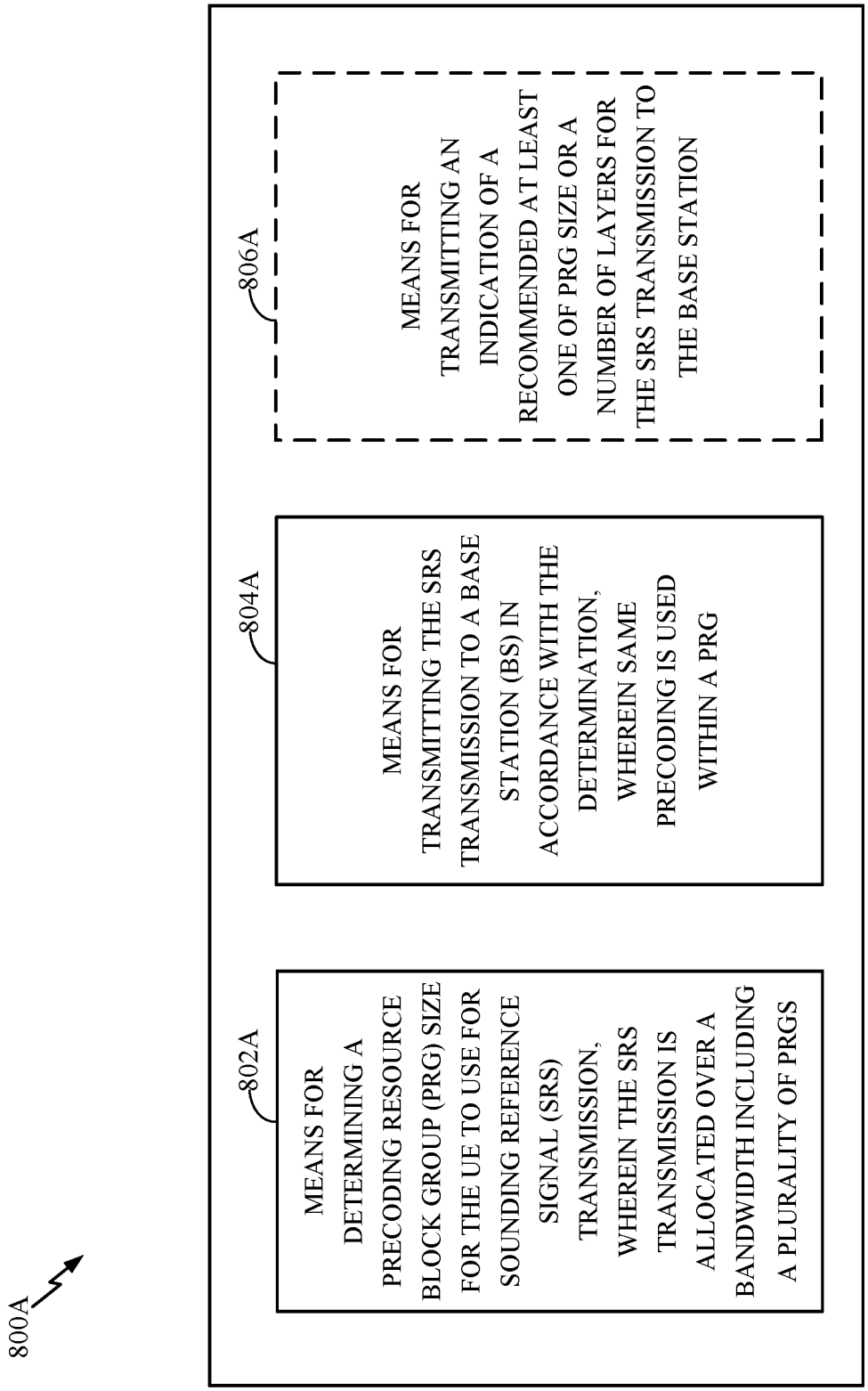
FIG. 8A shows a communication device illustrating means for performing operations for wireless communications, according to certain aspects of the present disclosure.

FIG. 8A illustrates a communications device 800A that may include various means-plus-function components configured to perform the operations illustrated in FIG. 8. For example, at 802A, the communications device 800A includes means for performing the operations illustrated at 802 in FIG. 8. Particularly, in one or more cases, the purpose of the means 802A is to serve as a processing element for the UE for determining one or more properties for use when transmitting reference signals. For example, the means 802A may be configured to determine a PRG size for the UE to use for SRS transmission. In some cases, the SRS transmission may be allocated over a bandwidth including a plurality of PRGs. Additionally, at 804A, the communications device 800A includes means for performing the operations illustrated at 804 in FIG. 8. Particularly, the purpose of the means 804A, in one or more cases, is to serve as a transmitter for the UE for transmitting one or more reference signals to a base station. For example, the means 804A may be configured to transmit the SRS transmission to a base station (BS) based on the PRG size determined by the means 802A. In some cases, a same precoding is used within a PRG. In one or more cases, at least two of the plurality of PRGs may have different precoding. Optionally, at 806A, the communications device 800A may further include means for performing the operations illustrated at 806 in FIG. 8. Particularly, the communication device 800A may include means for transmitting an indication of a recommended at least one of PRG size or a number of layers for the SRS transmission to the base station.

Figure 9:
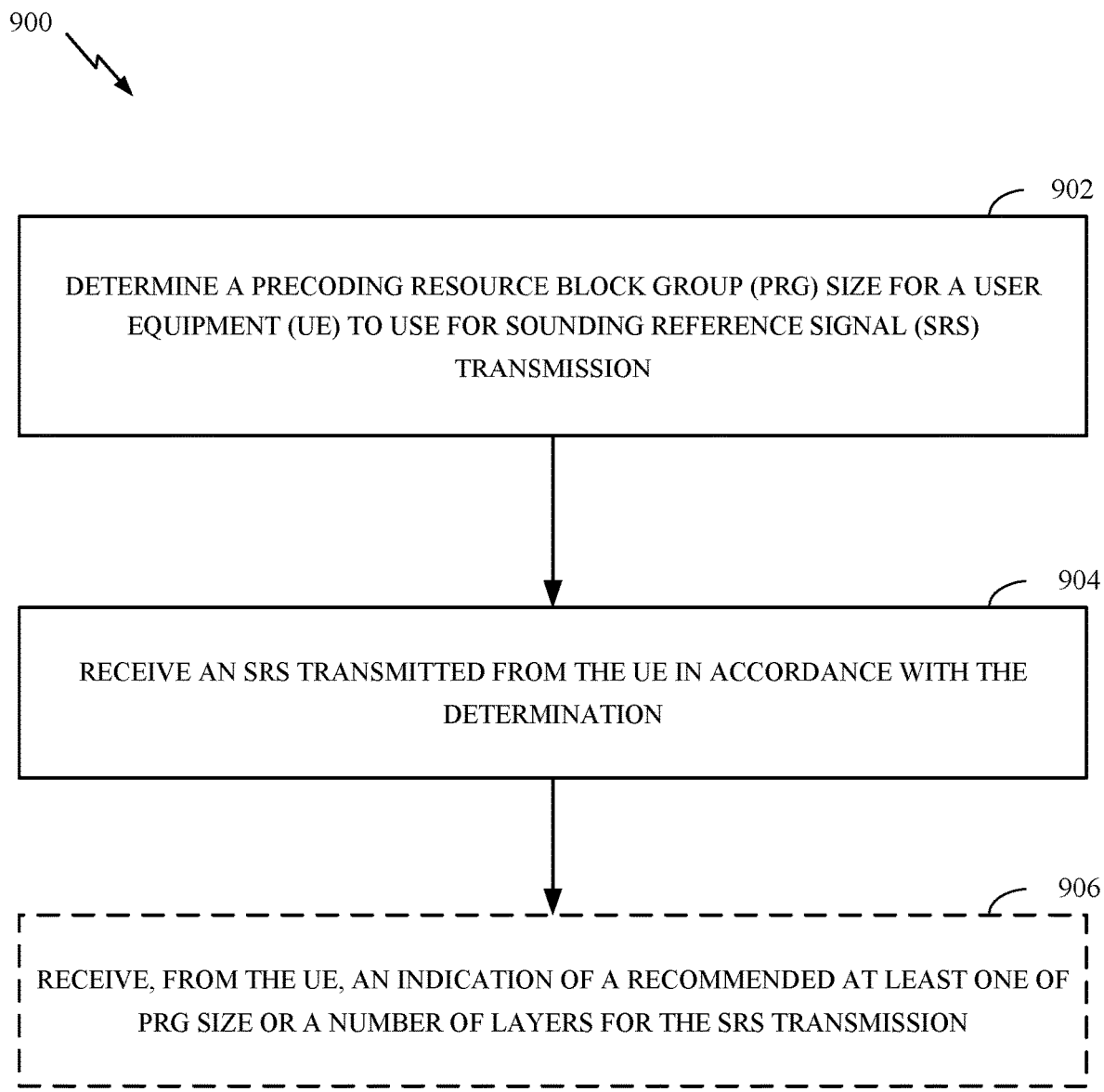
FIG. 9 illustrates example operations for wireless communications by a base station, in accordance with aspects of the present disclosure.

FIG. 9 illustrates example operations for wireless communications by a base station, in accordance with aspects of the present disclosure. For example, the base station may be configured to determine the PRG size the UE will use for SRS transmissions that the BS may then use when receiving SRS transmission from the UE.

Specifically, operations 900 begin, at block 902, with the base station determining a physical resource block group (PRG) size for a user equipment (UE) to use for sounding reference signal (SRS) transmission. The determination may be based a number of ports used for the SRS transmission. The PRG size may correspond to a whole operating bandwidth if the number of layers is below a predetermined number. The determination may be based on power headroom of the UE. The PRG size may correspond to a whole operating bandwidth if there is no UE power headroom available because the UE is transmitting at full power.

The base station also may include, as shown at block 904, receiving an SRS transmitted from the UE in accordance with the determination. For example, the base station may have a receiver that receives a transmission. The transmission may originate from the UE and may include the SRS transmission that is sent in accordance with the determined PRG size. For example, the SRS transmission may be precoded differently depending on the subband of the SRS transmission. Further, as shown at 906, the method may optionally include receiving, from the UE, an indication of a recommended at least one of PRG size or a number of layers for the SRS transmission. The BS may take this indication into consideration when determining the PRG size. In one or more cases, the BS may use the indication when received and may otherwise use a calculated value in other cases were such an indication is not received.

Figure 9A:
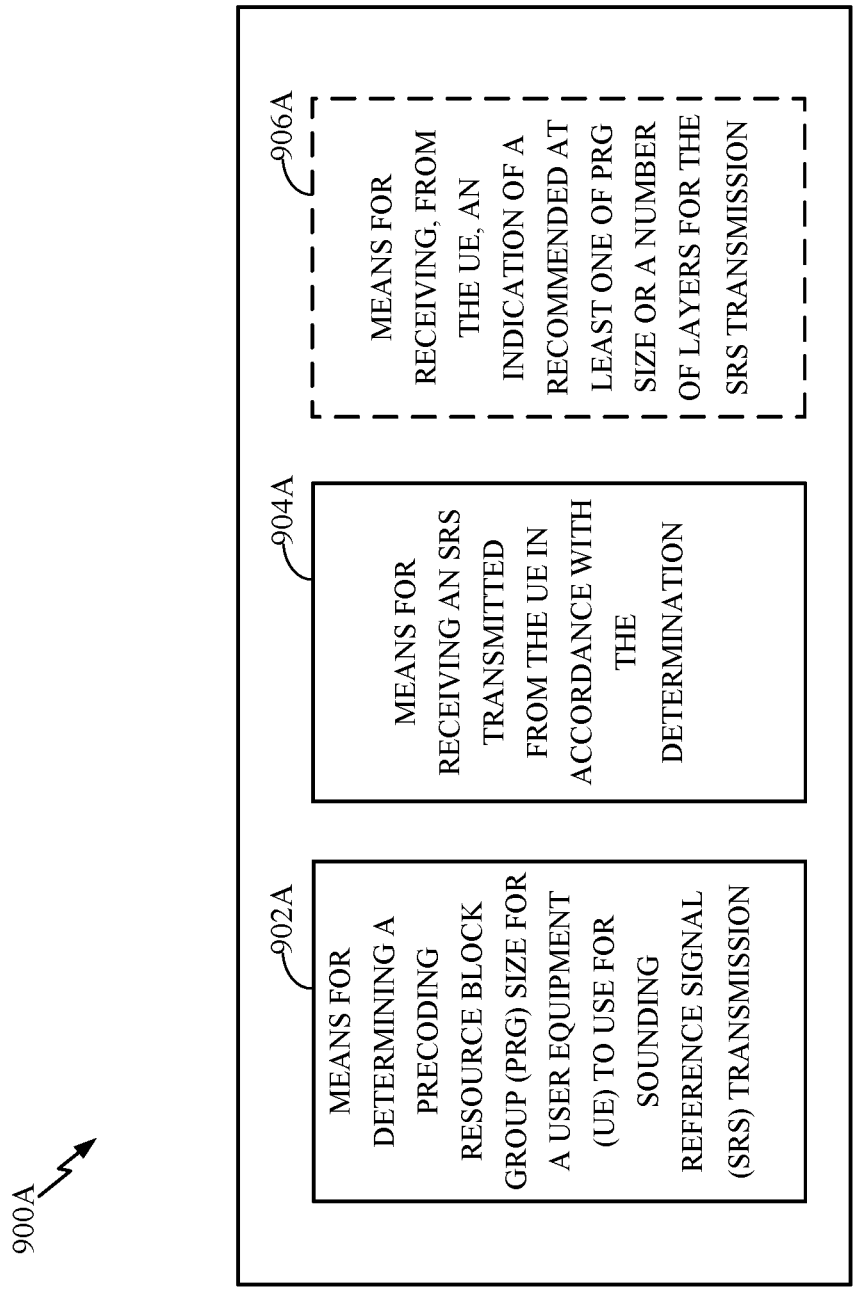
FIG. 9A shows a communication device illustrating means for performing operations for wireless communications, according to certain aspects of the present disclosure.

FIG. 9A illustrates a communications device 900A that may include various means-plus-function components configured to perform the operations illustrated in FIG. 9. For example, at 902A, the communications device 900A includes means for performing the operations illustrated at 902 in FIG. 9. Particularly, in one or more cases, the purpose of the means 902A is to serve as a processing element for the BS for determining one or more properties for use on received reference signals from a UE. For example, the means 902A may be configured to determine a PRG size for a UE to use for SRS transmission. Additionally, at 904A, the communications device 900A includes means for performing the operations illustrated at 904 in FIG. 9. Particularly, the purpose of the means 904A, in one or more cases, is to serve as a receiver for the BS for receiving one or more reference signals in one or more subbands from a UE. For example, the means 904A may be configured to receive an SRS transmission from a UE based on the PRG size determined by the means 902A. Optionally, at 906A, the communications device 900A may further include means for performing the operations illustrated at 906 in FIG. 9. Particularly, the communication device 900A may include means for receiving, from the UE, an indication of a recommended at least one of PRG size or a number of layers for the SRS transmission In some cases, the method may include signaling information regarding the PRG size to the UE. In some cases, the PRG size or a number of layers for the SRS transmission may be reused for the downlink. For example, the PRG size or a number of layers for the SRS transmission may be used for transmitting one or more downlink reference signals from the BS to the UE. At least one factor that may contribute to this reuse includes channel reciprocity. Particularly, because of channel reciprocity, the DL channel may be estimated from the UL measurements.

Figure 10:
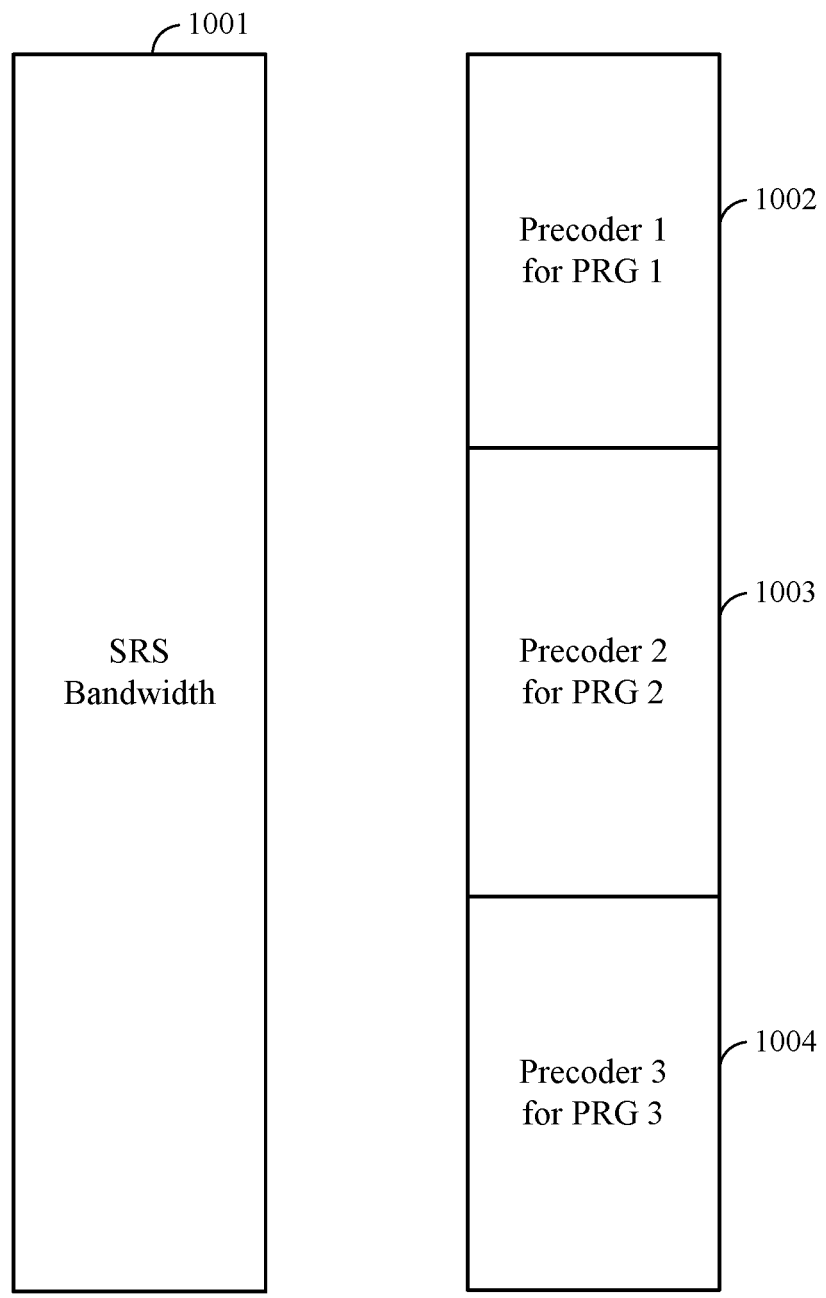
FIG. 10 illustrates an example of subband precoding, in accordance with aspects of the present disclosure.

For SRS transmission, SRS may be precoded differently for different subbands. For example, FIG. 10 illustrates subband precoding, in accordance with aspects of the present disclosure. According to some aspects, an SRS bandwidth 1001 is shown that spans a number of subbands 1002, 1003, and 1004. In this example there are three subbands 1002, 1003, and 1004 which correspond to the three shown precoders and physical resource groups (PRGs). Specifically, the SRS bandwidth corresponds to PRG 1, PRG 2, and PRG 3 as shown. Further, PRG 1, PRG 2, and PRG 3 are precoded using the corresponding precoders Precoder 1, Precoder 2, and Precoder 3, respectively.

According to one or more cases, the units that define the parameters and size for different subbands of a PRG (Physical Resource Group) may vary. For example, a PRG may be 2^n*PRB (Physical Resource Block) and the PRB may be 12 tones. In one or more cases, the PRG may be any number of sizes such as, but not limited to 1, 2, 4, 8, and so on, which corresponds to 2^n*PRB, where n=0, 1, 2, 3. and so on. Further, the PRG is not limited to a specific number of tones and may therefore be any number of tones depending on the specific embodiment.

The PRG size may be configured by a UE and/or a gNB. In accordance with one or more aspects, the PRG size may also be configured based on number of layers (ports). According to one or more cases, the PRG may be a whole band and no subband precoding may be applicable if a number of layers is less than a predetermined number, for example 4.

According to one or more aspects, in addition to the PRG size being configurable by a UE and/or a gNB, the PRG size may also be configured based on UE power headroom. Take for instance, in accordance with one or more aspects, a case when there is no UE power headroom available because the UE is transmitting at full power. In this case with no UE power headroom a full band precoding may be chosen. For example, the UE may be transmitting at full power if there is no UE power headroom. In this case the PRG may be equal to a whole SRS band.

In accordance with one or more aspects, in a case where there is UE power headroom then one may then be free to use subband precoding. In this example, when there is UE power headroom the PRG size may therefore be less than the whole SRS band.

Figure 11:
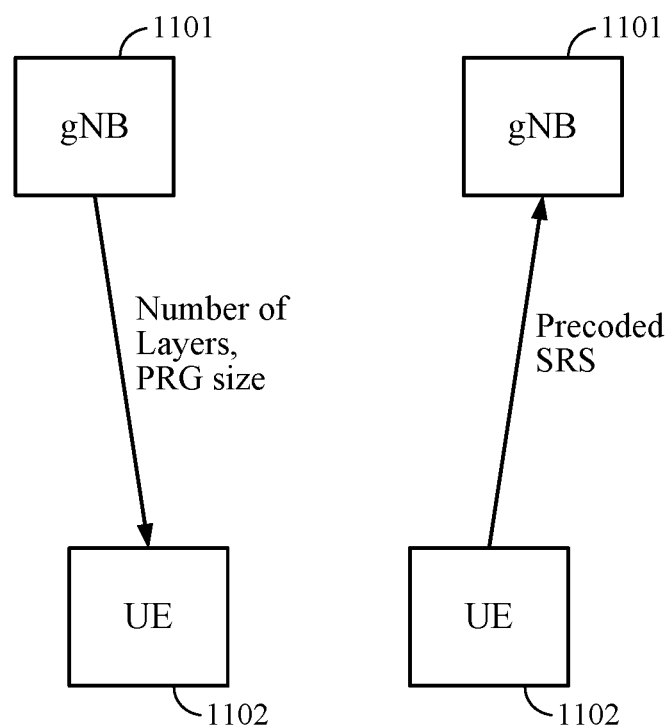
FIG. 11 illustrates an example of a wireless system transmitting in accordance with aspects of the present disclosure.

FIG. 11 illustrates an example of a wireless system transmitting in accordance with aspects of the present disclosure. Particularly, FIG. 11 shows a gNB 1101 transmitting to a UE 1102 and then shows the UE 1102 responding to the gNB 1101.

Specifically, the gNB 1101 may configure the number of layers for SRS and/or a PRG size for SRS, which may be determined by the number of layers. The gNB 1101 then transmits the number of layers and/or a PRG size to the UE 1102. The UE 1102 then generates a Precoded SRS based on the received transmissions from the gNB 1101. The UE 1102 may then transmit the Precoded SRS with configured layers and PRG size. In accordance with one or more cases, a precoding matrix for SRS may be configured such that the precoding matrix remains constant for each PRG.

Figure 12:
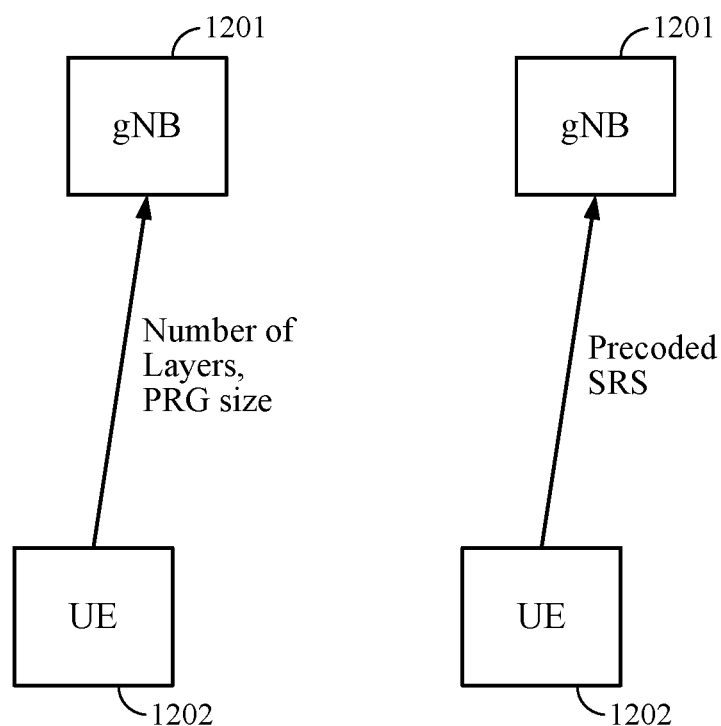
FIG. 12 illustrates an example of a wireless system transmitting in accordance with aspects of the present disclosure.

FIG. 12 illustrates another example of a wireless system transmitting in accordance with aspects of the present disclosure. Particularly, FIG. 12 shows a UE 1202 transmitting a number of layers and/or a PRG size to a gNB 1201 and then shows the UE 1202 also transmitting to the gNB 1201 a precoded SRS.

Specifically, FIG. 12 shows the UE 1202 transmitting one or more indication that may contain suggestions of the number of layers for SRS and/or also the PRG size for SRS, which may be determined by the number of layers. The UE 1202 may then transmit a precoded SRS that is configured based on the suggested layers and/or PRG size. In accordance with one or more cases, a precoding matrix for SRS may be configured such that the precoding matrix remains constant for each PRG.

In one or more cases, the wireless system may be configured such that the number of layers and/or the PRG size may be reused for downlink transmissions as well as the uplink transmissions as described above. In particular the SRS (uplink) may be also used for downlink channel estimation based on channel reciprocity.

Example of Time Splitting Symbols

Figure 13:
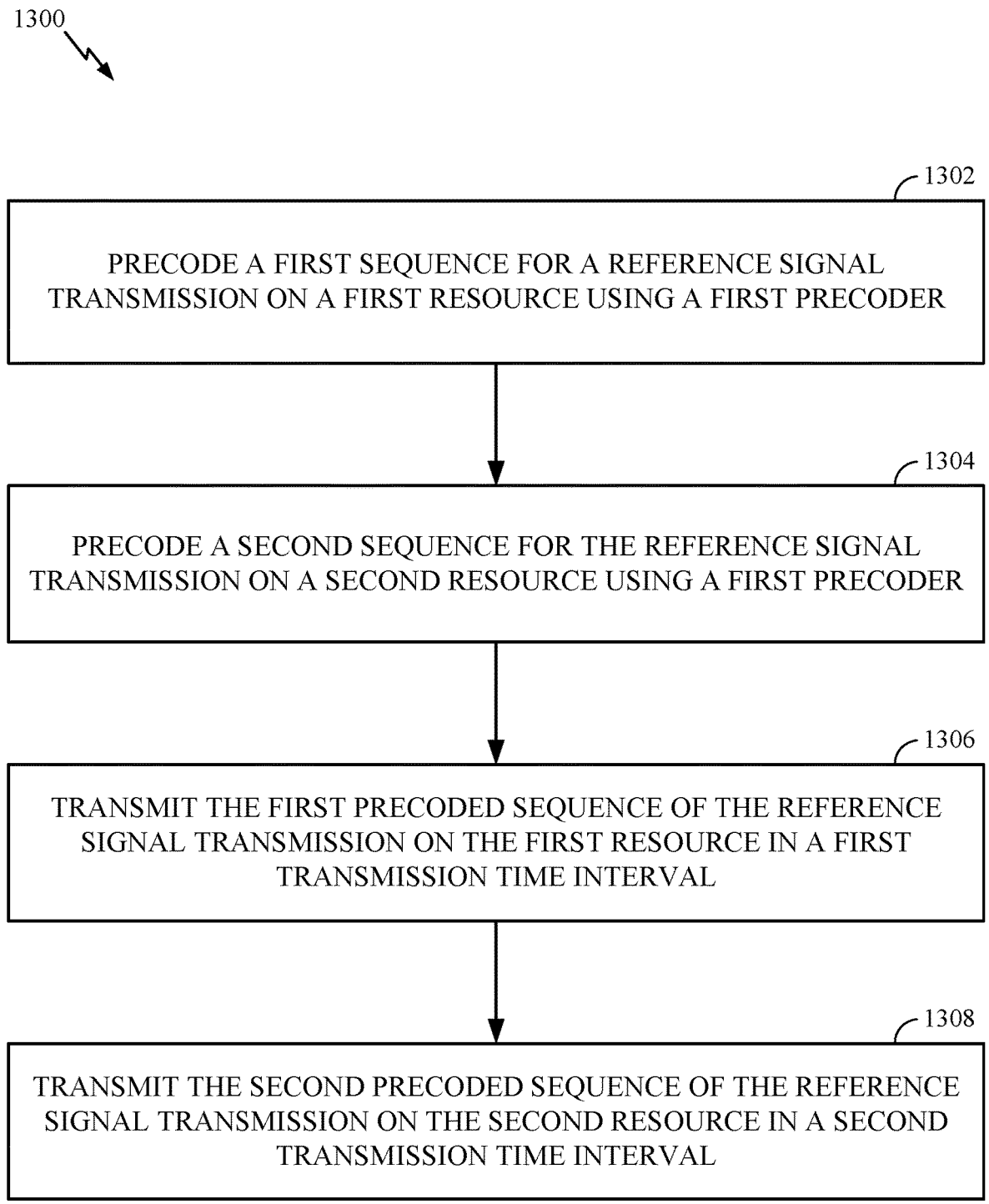
FIG. 13 illustrates example operations for wireless communications by an apparatus, in accordance with aspects of the present disclosure.

FIG. 13 illustrates example operations 1300 for wireless communications by an apparatus, in accordance with aspects of the present disclosure. Particularly, as shown in FIG. 13, the operations 1300 may include precoding multiple sequences of a reference signal with different precoders and then transmitting the precoded sequences of the reference signal.

Specifically, operations 1300 begin, at block 1302, with the apparatus precoding a first sequence for a reference signal transmission on a first resource using a first precoder. In one or more cases, the apparatus may be at least one of a user equipment (UE) or a base station (BS). Further, the reference signal may at least be one of a sounding reference signal (SRS) when the apparatus is a UE and a downlink (DL) reference signal when the apparatus is a BS. Additionally, in some cases, the first resource may be at least one of a first subband and/or a first port.

The operations 1300 also include, at block 1304, precoding a second sequence for the reference signal transmission on a second resource using a second precoder. In one or more cases, the second resource may be at least one of a second subband and/or a second port. In accordance with one or more aspects, the first and second precoders may be different. In one or more cases, different physical resource block groups (PRG) sizes may be used for the first and second SRS transmissions.

Operations 1300 further include, at block 1306, transmitting the first precoded sequence of the reference signal transmission on the first resource in a first transmission time interval. In one or more cases, the apparatus that precodes and transmits the first sequence may be a user equipment (UE). In these cases the reference signal may be a sounding reference signal (SRS). In accordance with other cases, the apparatus that precodes and transmits the first sequence may be a base station (BS). In these cases the reference signal may be a downlink (DL) reference signal. In accordance with one or more cases, the first resource is at least one of a first subband or a first port.

Further, operations 1300 includes, at block 1308, transmitting the second precoded sequence of the reference signal transmission on the second resource in a second transmission time interval. In one or more cases, the first transmission time interval is different from the second transmission time interval. In one or more cases, the apparatus that precodes and transmits the second sequence may be a user equipment (UE). In these cases the reference signal may be a sounding reference signal (SRS). In accordance with other cases, the apparatus that precodes and transmits the second sequence may be a base station (BS). In these cases the reference signal may be a downlink (DL) reference signal. In accordance with one or more cases, the second resource is at least one of a second subband or a second port.

Figure 13A:
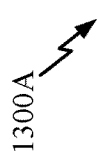
FIG. 13A shows a communication device illustrating means for performing operations for wireless communications, according to certain aspects of the present disclosure.

FIG. 13A illustrates a communications device 1300A that may include various means-plus-function components configured to perform the operations illustrated in FIG. 13. For example, at 1302A, the communications device 1300A includes means for performing the operations illustrated at 1302 in FIG. 13. Particularly, in one or more cases, the purpose of the means 1302A is to serve as a processing element of the apparatus for precoding a first sequence of a reference signal that may be transmitted later. For example, according to one or more cases, an IDFT size may be used for the first sequence and may scale with a number of tones in the first subband. In one or more cases, the means 1302A may add at least one cyclic prefix to the first precoded sequence. Further, the IDFT size may be scaled by one half and the number of tones in the first subband may also be scaled by half.

Additionally, at 1304A, the communications device 1300A includes means for performing the operations illustrated at 1304 in FIG. 13. Particularly, in one or more cases, the purpose of the means 1304A is to serve as a processing element of the apparatus for precoding a second sequence of a reference signal that may be transmitted later. For example, according to one or more cases, an IDFT size may be used for the second sequence and may scale with a number of tones in the second subband. In one or more cases the means 1304A may add at least one cyclic prefix to at least the second precoded sequence. Further, the IDFT size may be scaled by one half and the number of tones in the second subband may also be scaled by half.

Further, at 1306A, the communications device 1300A includes means for performing the operations illustrated at 1306 in FIG. 13. Particularly, the purpose of the means 1306A, in one or more cases, is to serve as a transmitter for the apparatus for transmitting one or more portions of a reference signal. For example, the means 1306A may be configured to transmit the first precoded sequence of an SRS transmission precoded by the means 1302A. Additionally, at 1308A, the communications device 1300A includes means for performing the operations illustrated at 1308 in FIG. 13. Particularly, the purpose of the means 1308A, in one or more cases, is to serve as a transmitter for the apparatus for transmitting one or more portions of a reference signal. For example, the means 1308A may be configured to transmit the second precoded sequence of an SRS transmission precoded by the means 1304A.

Figure 14:
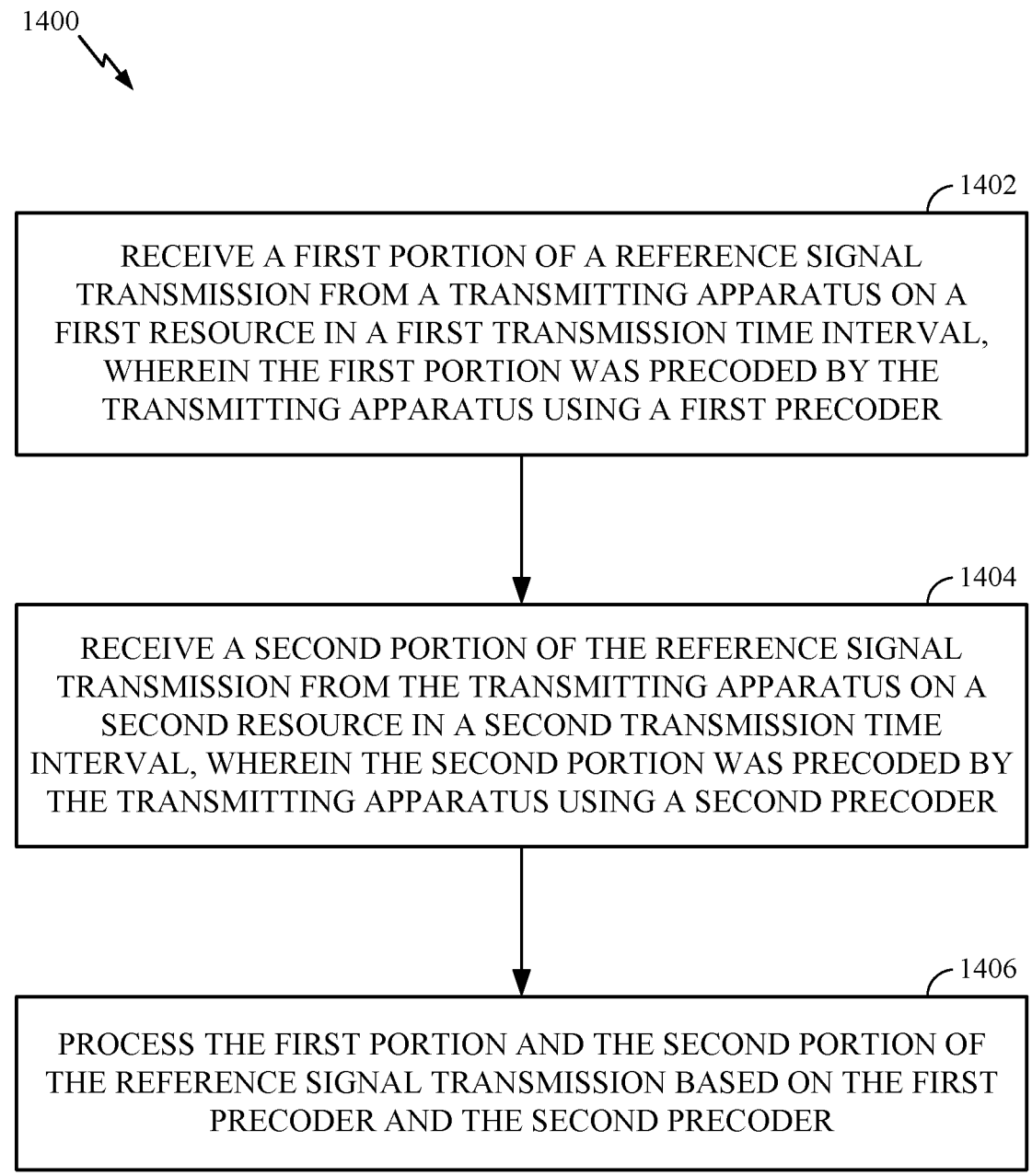
FIG. 14 illustrates example operations for wireless communications by an apparatus, in accordance with aspects of the present disclosure.

FIG. 14 illustrates example operations 1400 for wireless communications by an apparatus, in accordance with aspects of the present disclosure. Particularly, as shown in FIG. 14, the operations 1400 include receiving a first and second portion of a reference signal during different time intervals and processing the received portions.

Specifically, operations 1400 begin, at block 1402, with the apparatus receiving a first portion of a reference signal transmission from a transmitting apparatus on a first resource in a first transmission time interval, wherein the first portion was precoded by the transmitting apparatus using a first precoder. In one or more cases, the apparatus that receives the first portion may be a base station (BS) and the transmitting apparatus may be a user equipment (UE). In these cases, the reference signal transmission may be a sounding reference signal (SRS) transmission. In other cases, the apparatus that receives the first portion may be a user equipment (UE) and the transmitting apparatus may be a base station (BS). In these cases, the reference signal transmission may be a downlink (DL) reference signal transmission. In some cases, the first resource may be at least one of a first subband or a first port.

The apparatus also includes, as shown at block 1404, receiving a second portion of the reference signal transmission from the transmitting apparatus on a second resource in a second transmission time interval, wherein the second portion was precoded by the transmitting apparatus using a second precoder. In one or more cases, the apparatus that receives the second portion may be a base station (BS) and the transmitting apparatus may be a user equipment (UE). In these cases, the reference signal transmission may be a sounding reference signal (SRS) transmission. In other cases, the apparatus that receives the second portion may be a user equipment (UE) and the transmitting apparatus may be a base station (BS). In these cases, the reference signal transmission may be a downlink (DL) reference signal transmission. In some cases, the second resource may be at least one of a second subband or a second port.

The apparatus also includes, at block 1406, processing the received portions of a reference signal transmission. Specifically, the apparatus may process the first portion of the reference signal transmission based on the first precoder. Further, the apparatus may also process the second portion of the reference signal transmission based on the second precoder. In one or more cases the apparatus may be a BS that is configured to process a first and second portion of an SRS transmission from a UE based on the first and second precoders. In other cases, the apparatus may be a UE that is configured to process a first and second portion of a DL reference signal transmission from a BS based on the first and second precoders.

Figure 14A:
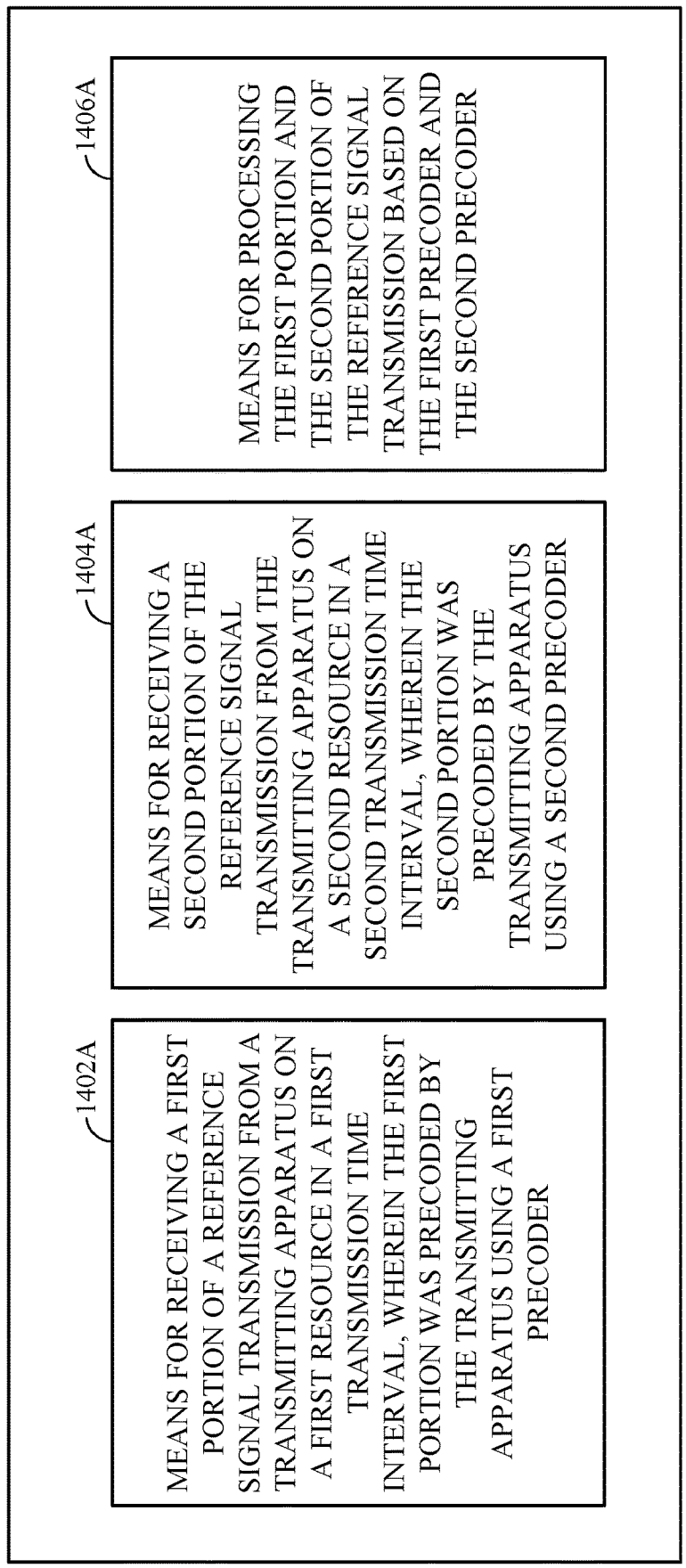
FIG. 14A shows a communication device illustrating means for performing operations for wireless communications, according to certain aspects of the present disclosure.

FIG. 14A illustrates a communications device 1400A that may include various means-plus-function components configured to perform the operations illustrated in FIG. 14. For example, at 1402A, the communications device 1400A includes means for performing the operations illustrated at 1402 in FIG. 14. Particularly, the purpose of the means 1402A, in one or more cases, is to serve as a receiver of the apparatus for receiving one or more portions of reference signals from a transmitting apparatus. For example, the means 1402A may be configured to receive a first portion of a reference signal transmission from a transmitting apparatus on a first resource in a first transmission time interval, wherein the first portion was precoded by the transmitting apparatus using a first precoder.

Additionally, at 1404A, the communications device 1400A includes means for performing the operations illustrated at 1404 in FIG. 14. Particularly, the purpose of the means 1404A, in one or more cases, is to serve as a receiver of the apparatus for receiving one or more other portions of reference signals from a transmitting apparatus. For example, the means 1404A may be configured to receive a second portion of a reference signal transmission from a transmitting apparatus on a second resource in a second transmission time interval, wherein the second portion was precoded by the transmitting apparatus using a s precoder.

Further, at 1406A, the communications device 1400A includes means for performing the operations illustrated at 1406 in FIG. 14. Particularly, in one or more cases, the purpose of the means 1406A is to serve as a processing element for the apparatus for processing one or more portions of a reference signal transmission. For example, the means 1406A may be configured to process the first portion and the second portion of the references signal transmission based on the first and second precoders.

According to one or more aspects, the processing may include removing at least one cyclic prefix from at least one precoded sequence of at least one of the first or second portions of the SRS transmission. In some cases the first and second precoders may be different. According to one or more cases, different physical resource block groups (PRG) sizes may be used for the first and second SRS transmissions. In some cases, an IDFT size may be used for the first and second sequence and may scale with a number of tones in the first and second subbands. The IDFT size may scale by one half and the number of tones in the first and second subbands that may scale by half.

Figure 15:
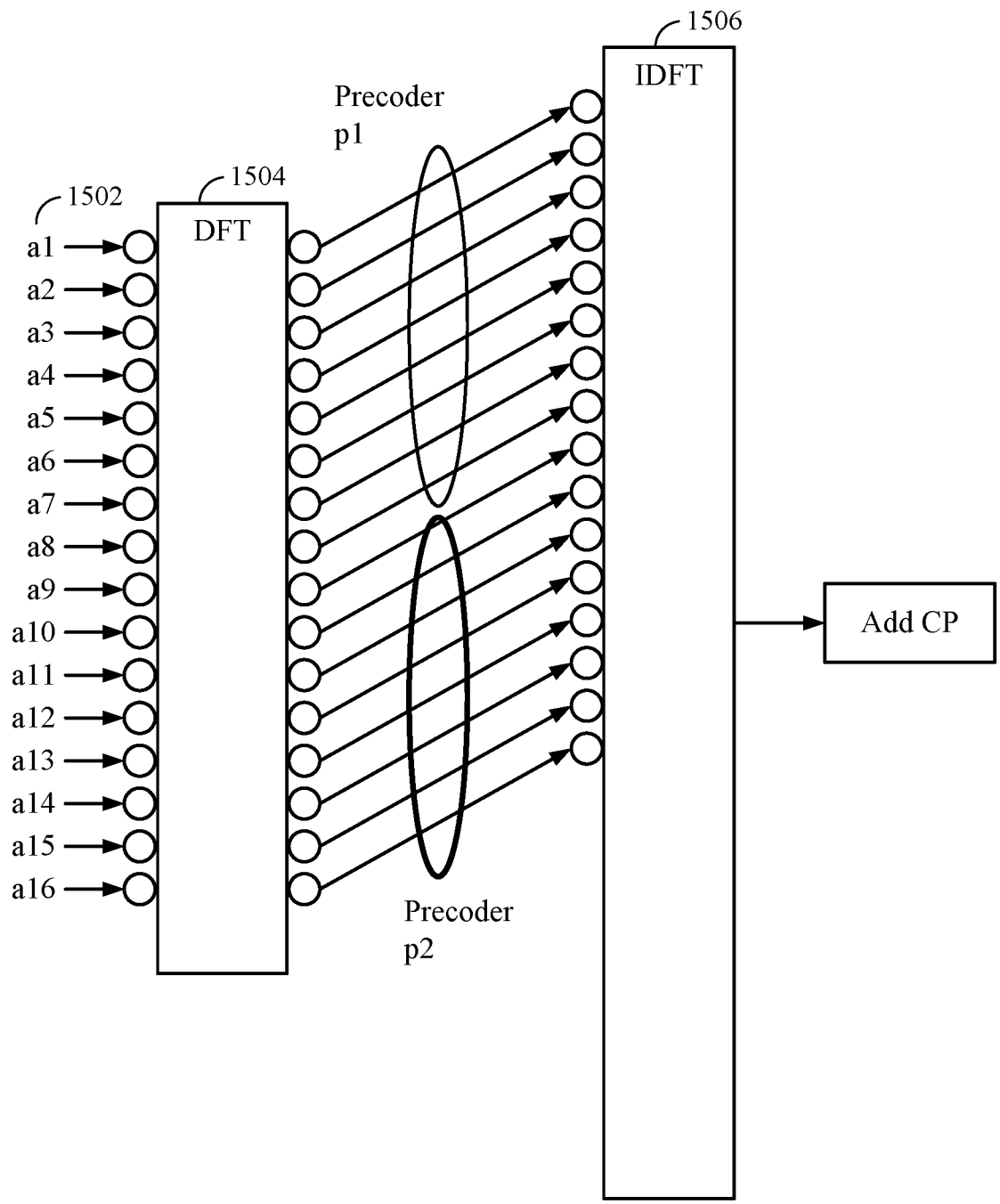
FIG. 15 illustrates an example of using multiple precoders at the same time, in accordance with aspects of the present disclosure.

FIG. 15 illustrates an example of using multiple precoders, p1 and p2, at the same time, in accordance with aspects of the present disclosure. Specifically, FIG. 15 shows a pilot sequence 1502 transmitting at time 'a' in parts a1 through a16. As shown, the sequence a1-a16 is input to a DFT 1504 and the output of the DFT is precoded using p1 and p2 before being provided to the IDFT 1506.

Particularly, as shown in FIG. 15, a different precoder (Precoder p1 and Precoder p2) are each used for a different frequency band at the same time. This use of a precoder for a particular frequency band may be called subband precoding. However, in this example, by using a different precoder for different subbands at the same time, the reference signal may not fit within a single carrier even for the logical port.

Figure 16:
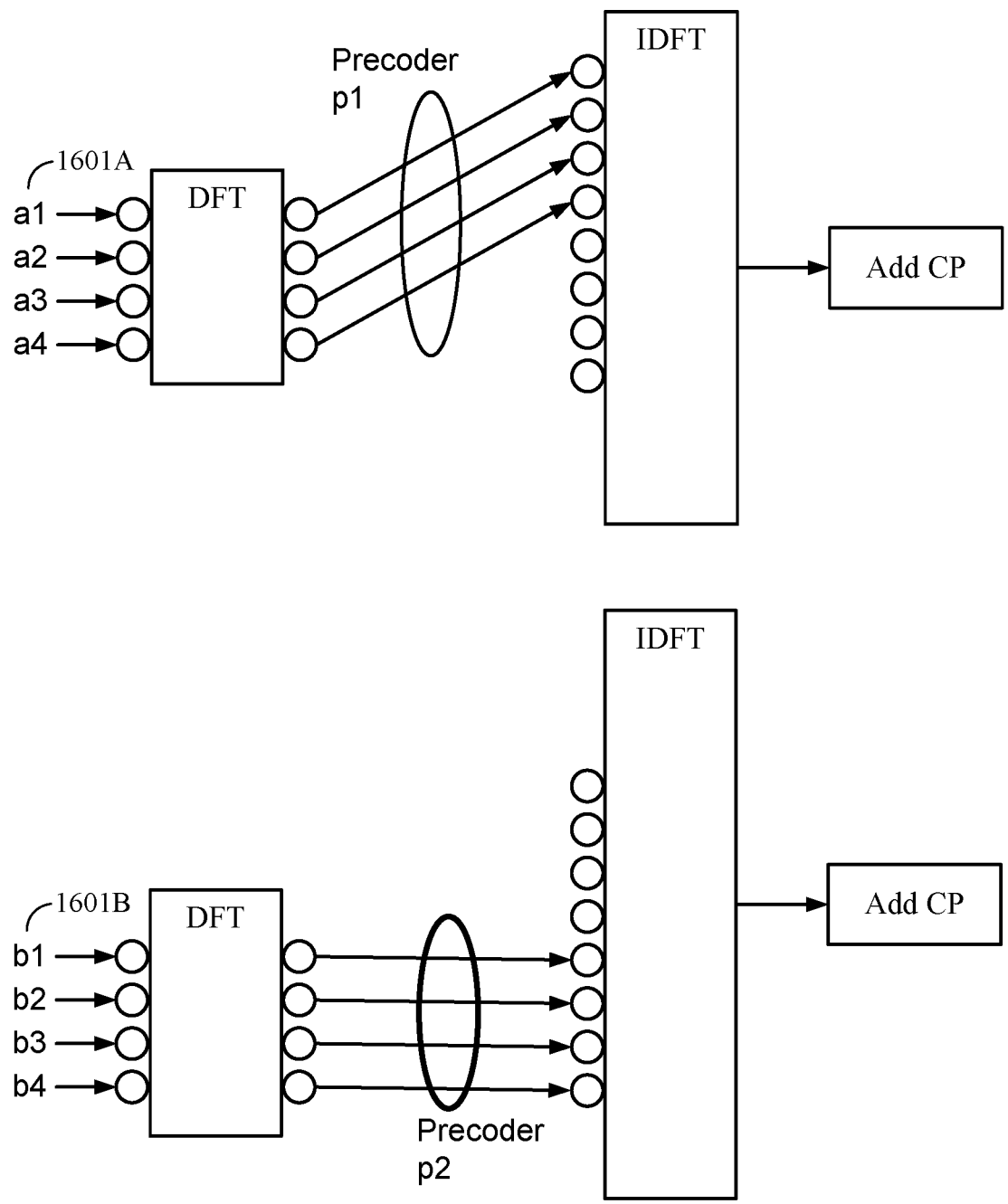
FIG. 16 illustrates an example of using different precoders at different times, in accordance with aspects of the present disclosure.

FIG. 16 illustrates an example of using different precoders p1 and p2 at different times, in accordance with aspects of the present disclosure. A waveform with large PAPR results from using different precoders for different subbands compared to using one precoder over the whole bandwidth. One solution is to divide an SRS symbol into multiple parts. This division may reduce the IDFT by half, and the corresponding number of tones may also scale by half.

Specifically, in order to reduce the size of the overall reference signal, one or more cases are able to provide a time split when applying the precoder which provides for a size reduction as shown in FIG. 16. As shown a pilot sequence 1601A and pilot sequence 1601B are shown where each is at a different time 'a' and 'b' respectively. Particularly, pilot sequence 1601A is at time 'a' transmitting at a1-a4 and pilot sequence 1601B transmits b1-b4 at time V. As shown, by implementing a time splitting (TDM) approach, size reductions are provided to the other elements. For example, as shown in FIG. 16, by time splitting one or more cases may also reduce the IDFT size by half and the corresponding number of tones also scales by half, e.g., downsampled by half. With these size reductions it may be appreciated that in one or more cases the reference signal may now fit in a single carrier. In accordance with one or more cases, using a TDM approach may provide a Peak-to-Average Power Ratio (PAPR) reduction.

Figure 17:
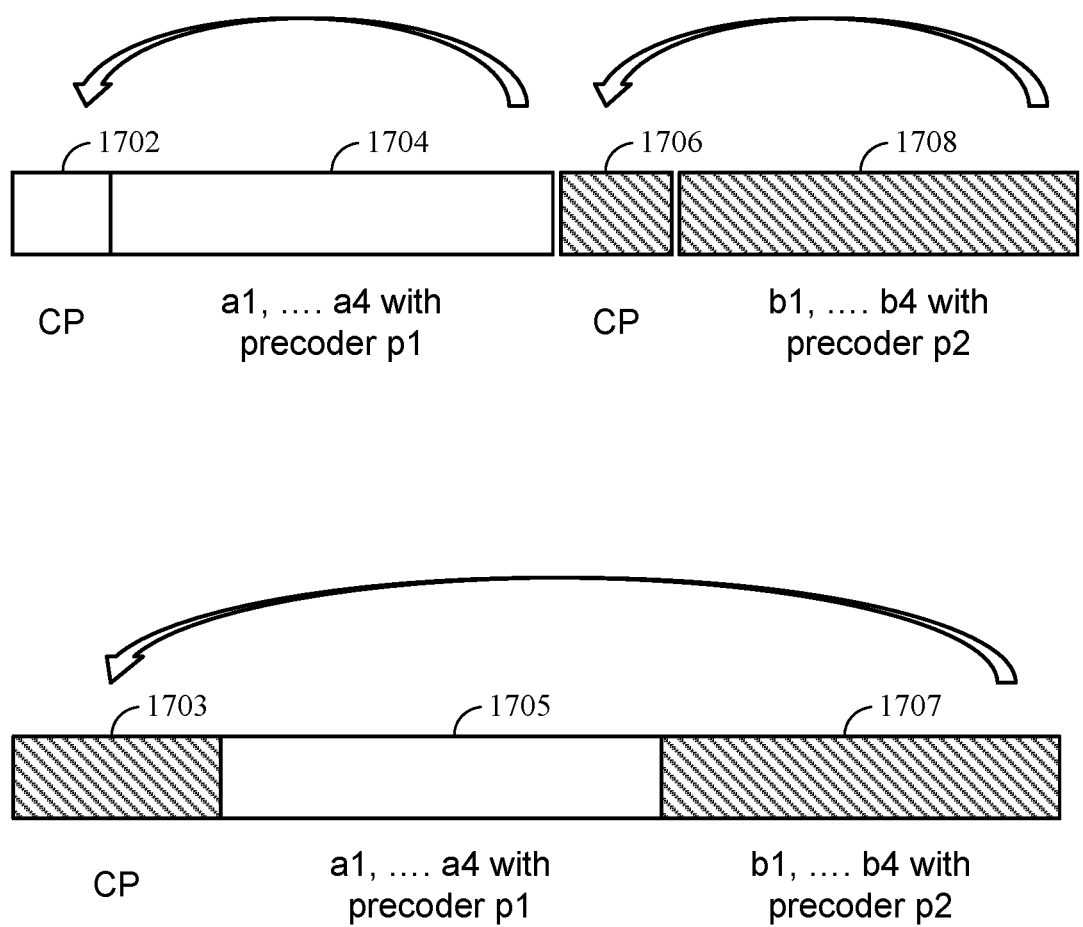
FIG. 17 illustrates examples of SRS transmissions, in accordance with aspects of the present disclosure.

Turning now to FIG. 17 examples of SRS transmissions are illustrated, in accordance with aspects of the present disclosure.

Particularly, FIG. 17 shows examples of PRG Size selection for SRS transmissions. As shown in the upper portion of FIG. 17, when different precoders are applied at different times (as done in FIG. 16) a resulting split is provided. Specifically, a CP 1702 is provided along with the sequence a1-a4 1704 that was precoded with precoderp1 that is split from a subsequent CP 1706 that is provided along with the sequence b1-b4 1708 that were precoded with precorderp2 as shown. Thus, as shown by introducing TDM across precoders, the resulting SRS is single carrier.

In contrast, in the lower portion of FIG. 17, when precoders are applied at the same time (as done in FIG. 15) a single resulting transmission is provided as shown. Specifically, a single larger CP 1703 is provided along with both the a1-a4 1705 and b1-b4 1707 which were precoded with precoderp1 and precorderp2 at the same time. Although a single split into two parts is shown in FIG. 17, it can be appreciated that aspects and cases in accordance with disclosure are not limited to this example. Particularly, there is not a limit to doing a half split, for example there could be a provided split into 3 or 4 or more by splitting into multiple times using multiple precoders. The idea is the precoder is being split over time.

Figure 18:
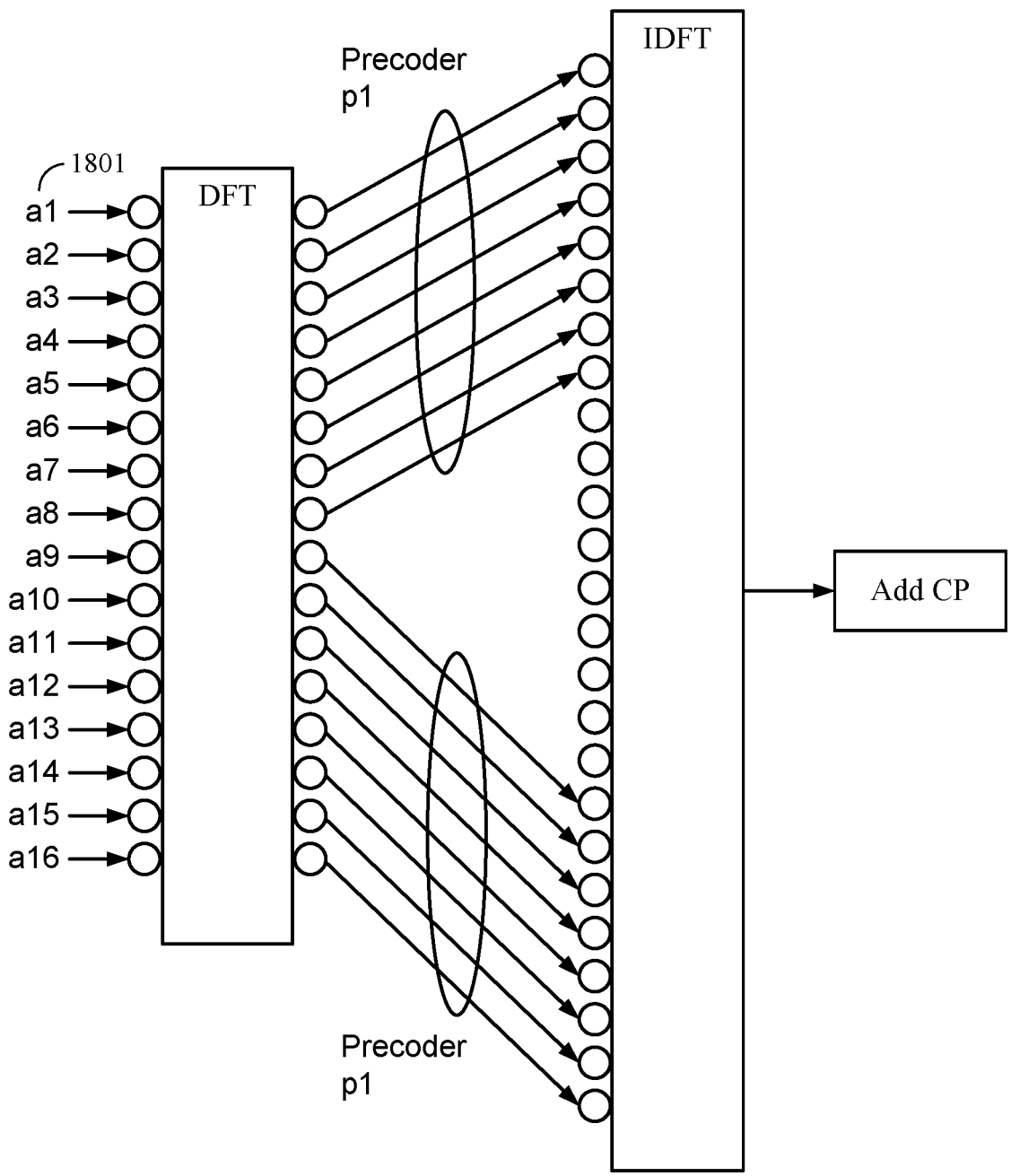
FIG. 18 illustrates an example of using reusing a single precoder at a single time, in accordance with aspects of the present disclosure.

FIG. 18 illustrates an example of using a single precoder at a single time, in accordance with aspects of the present disclosure. As shown the same precoder p1 is used to precode the pilot sequence 1801 that is made up of a1-a16.

Specifically, precoder p1 is used to precode a1-a8 and then the same precoder p1 is used to precode a9-a16 in a second subband. Thus, what is shown is multiband precoding using a single port and single precoder. However, similar to what occurred in FIG. 15, the resulting output may not fit in a single carrier. Specifically, even though a single precoder is used, if SRS is allocated over multiple frequency bands, the final SRS is not a single carrier any more.

Figure 19:
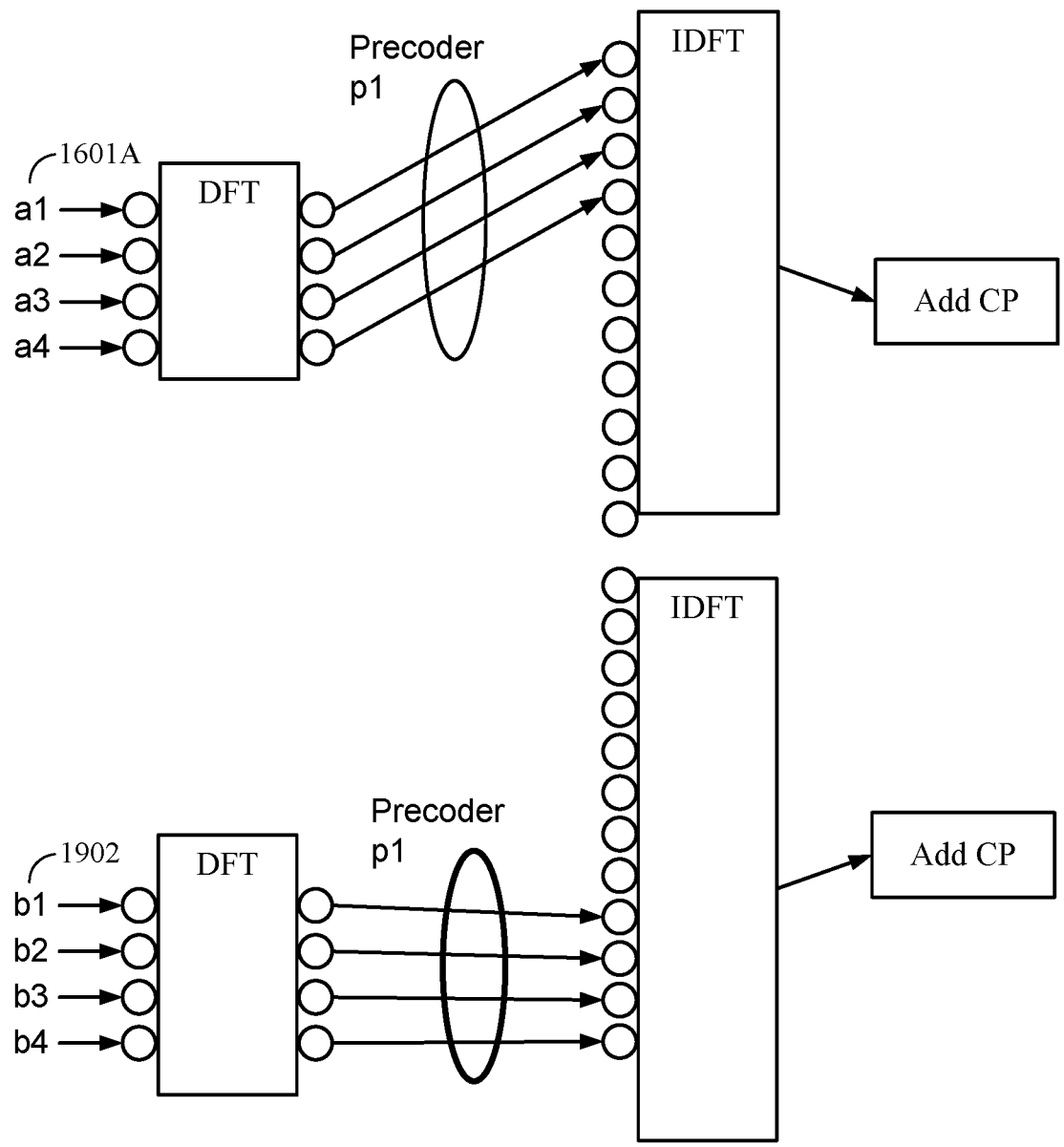
FIG. 19 illustrates an example applying a time split when applying the same precoder, in accordance with aspects of the present disclosure.

Therefore, looking at FIG. 19 a time split when applying the same precoder can be provided that allows for the output to fit into a single carrier. Specifically, FIG. 19 illustrates an example of using a single precoder p1 at different times, in accordance with aspects of the present disclosure.

Particularly, FIG. 19 shows a pilot sequence 1901 with parts a1, . . . , a4 transmitting at time 'a' and pilot sequence 1902 with b1, . . . , b4 transmitting at later time V. This time splitting and application of the precoder p1 provides a size reduction to other elements as shown. Specifically, a reduction in the IDFT size by half may be provided. Further, the corresponding number of tones also scales by half, e.g., downsampled by half.

Figure 20:
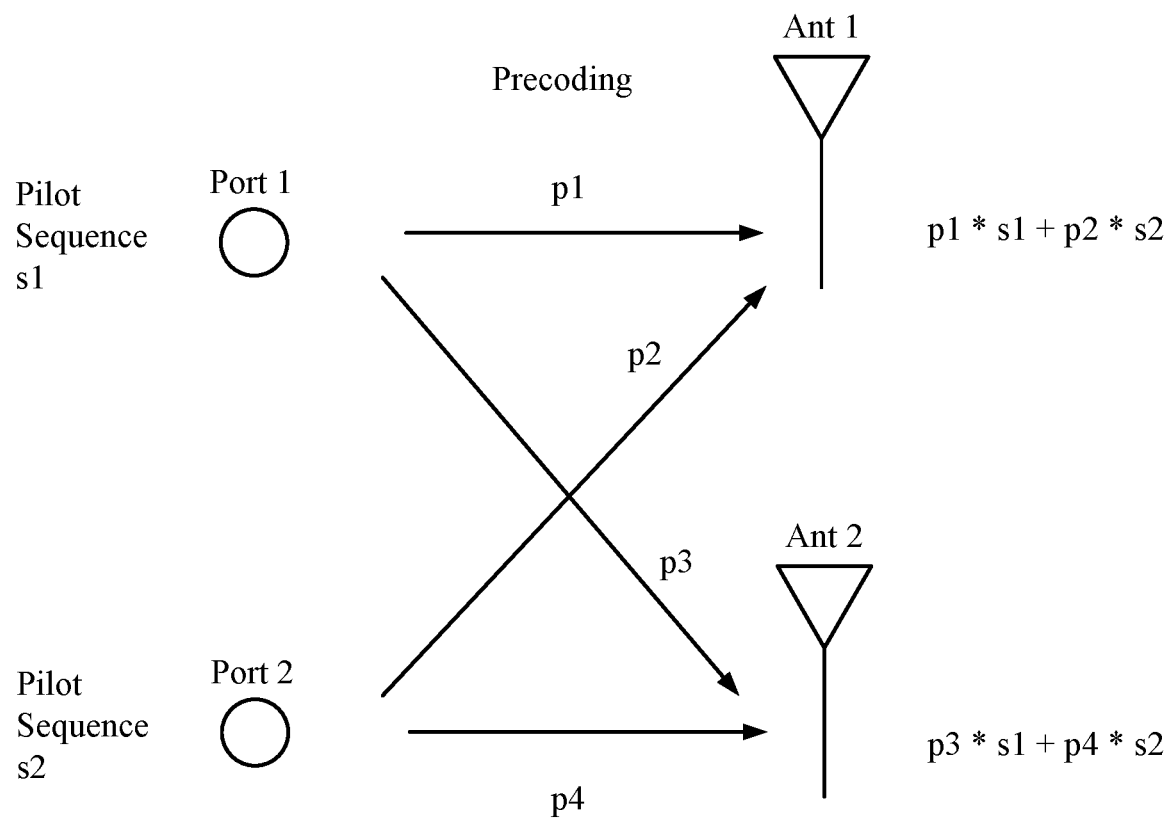
FIG. 20 illustrates an example of antenna transmission of precoded SRS, in accordance with aspects of the present disclosure.

FIG. 20 illustrates an example of antenna transmission of precoded SRS, in accordance with aspects of the present disclosure.

As shown a pilot sequence s1 is provided at port 1. Similarly, a pilot sequence s2 is provided at port 2. Further, FIG. 20 shows precoders p1, p2, p3, and p4 that are used to precode pilot sequences s1 and s2. Particularly, s1 is precoded with p1 and provided to antenna 1 (Ant 1) as well as s2 is precoded with p2 and provided to antenna 1. S1 is also precoded with p3 and provided to antenna 2 (Ant 2). S2 is precoded with p4 and provided to Antenna 2. Antenna 1 then transmits both s1 and s2 which are precoded with p1 and p2, respectively. Antenna 2 transmits both s1 and s2 precoded with p3 and p4, respectively.

However, an issue is present in this arrangement using precoded SRS as shown. Specifically, due to the precoding, even though pilot sequences (s1, s2) at the logical ports are single carriers, pilot sequences at the physical antennas (Ant 1 and Ant 2) are not single carrier because the signals were added in the time domain and transmitted.

Figure 21:
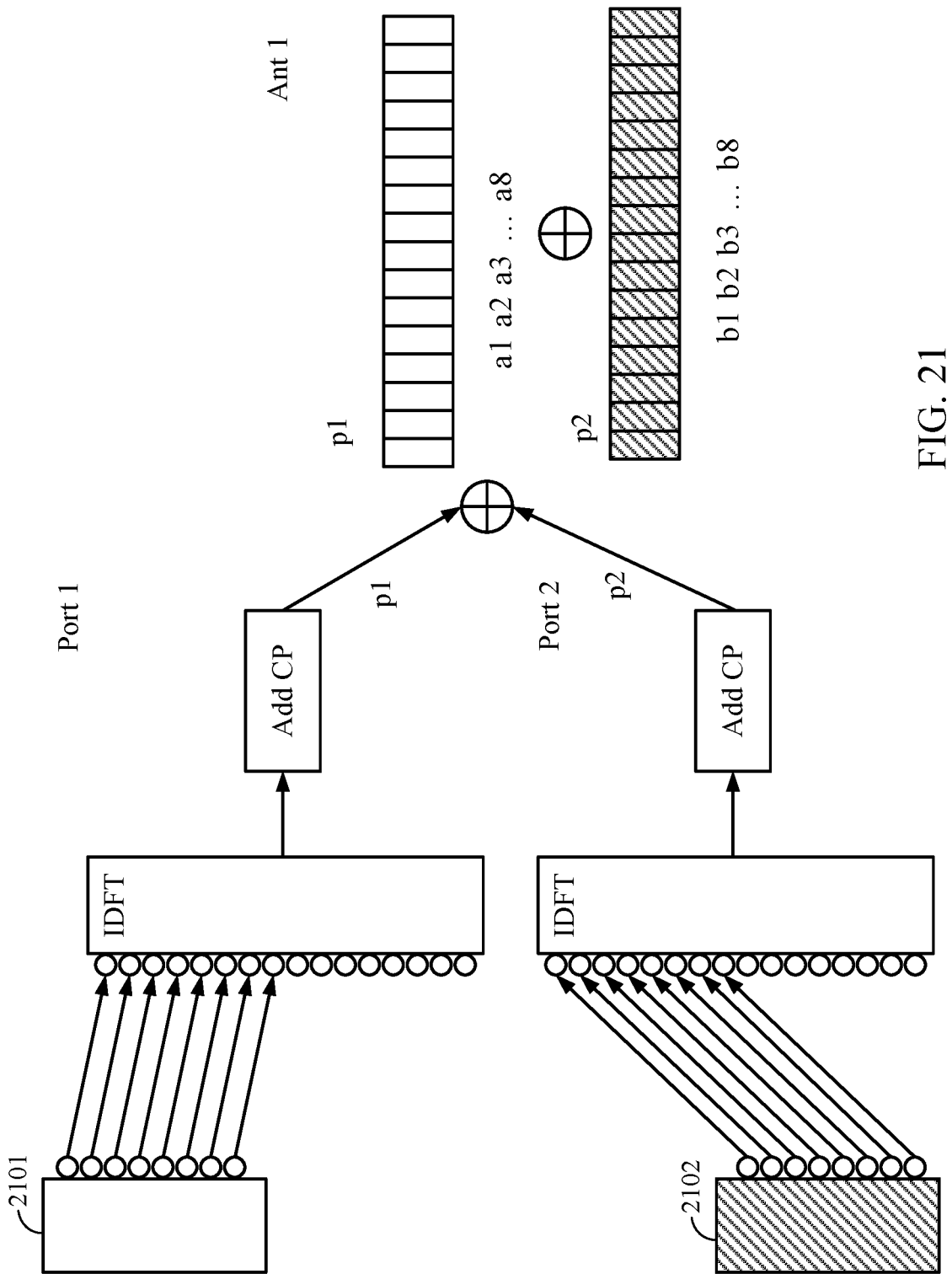
FIG. 21 illustrates an example FDM of precoded SRS, in accordance with aspects of the present disclosure.

This issue is further explained with reference to FIG. 21 that illustrates an example FDM of precoded SRS, in accordance with aspects of the present disclosure.

As shown a pilot sequence 2101 made up of a1-a8 is precoded using port 1 and a second pilot sequence 2102 made up of b1-b8 is precoded using port 2 at the same time. The outputs of these ports are then provided to a physical antenna for transmission. However, as shown, the antenna (Ant 1) transmission of the precoded sequences will not fit on a single carrier. Accordingly, similar to FIG. 20, the transmitted pilot sequences at the physical antennas are not single carrier.

Figure 22:
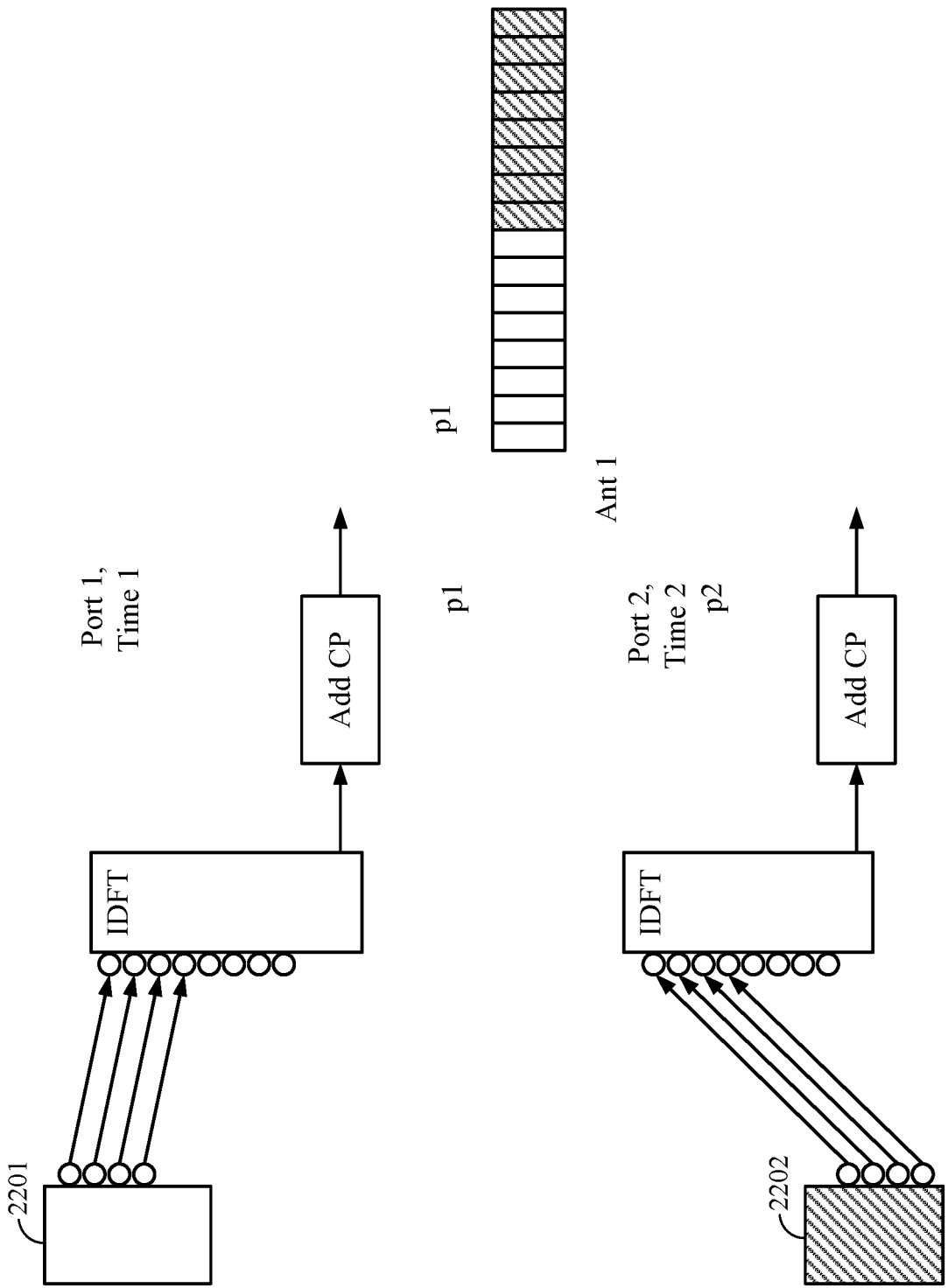
FIG. 22 illustrates a solution in the form of an example of time splitting precoding of SRS, in accordance with aspects of the present disclosure.

FIG. 22 illustrates a solution in the form of an example of time splitting precoding of SRS, in accordance with aspects of the present disclosure.

As shown a pilot sequence 2201 a1-a4 is precoded at a time 1 at port 1. Further, a pilot sequence 2202 b1-b4 is precoded at a time 2 at port 2. In the time domain, these pilot sequences don't add together. By precoding at different times the sequences are reduced in size and as a result other elements are also reduced in size. For example, as shown, a reduction of the IDFT size by half is provided in this example. Further, the corresponding number of tones also scales down by half. This reduction in size provides a precoded sequence that may fit on one carrier. In some cases, frequency domain sequences 2201 and 2202 may be chosen to have low-PAPR in the time-domain (e.g., as an extension or truncation of Zadoff-Chu Sequences).

Example of Separate Port for DFT-S-OFDM

Figure 23:
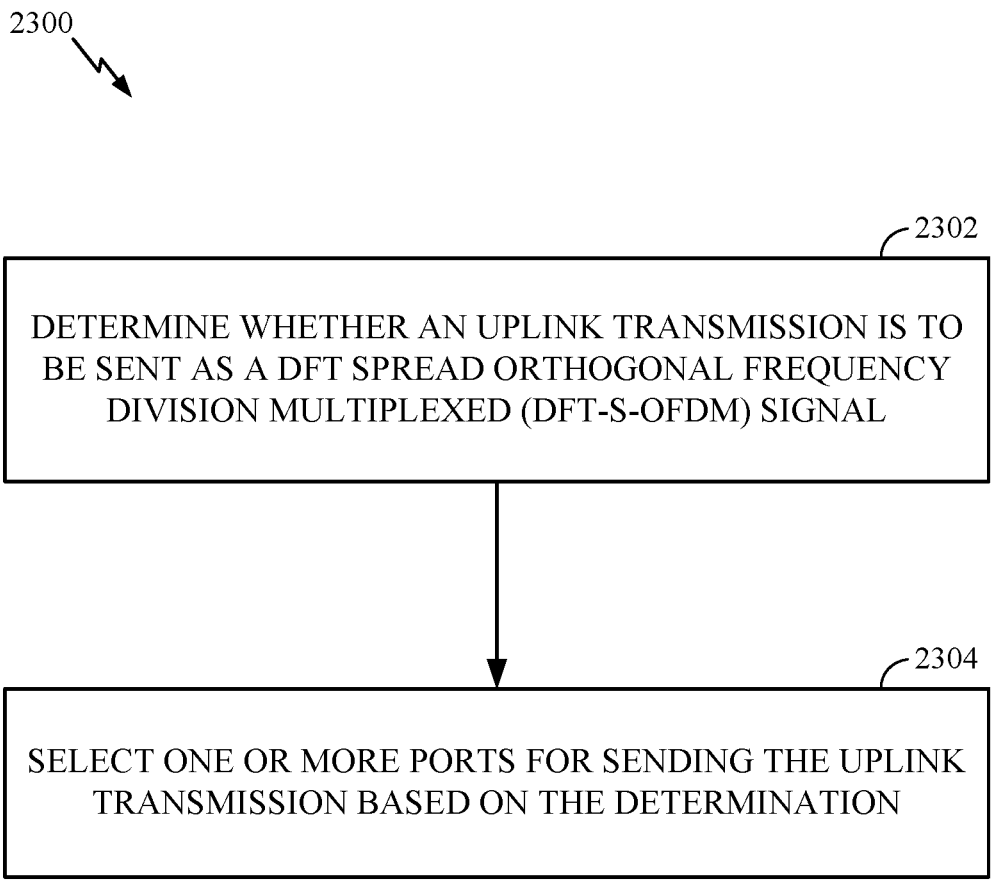
FIG. 23 illustrates example operations for wireless communications by a UE, in accordance with aspects of the present disclosure.

FIG. 23 illustrates example operations 2300 for wireless communications by a UE, in accordance with aspects of the present disclosure.

Operations 2300 begin, at block 2302, with the UE determining whether an uplink transmission is to be sent as a DFT spread orthogonal frequency division multiplexed (DFT-s-OFDM) signal. In one example, the uplink transmission may be sent as a DFT spread orthogonal frequency division multiplexed (DFT-s-OFDM) signal or an orthogonal frequency division multiplexed (OFDM) signal.

The UE also, at block 2304, selects one or more ports for sending the uplink transmission based on the determination. According to other aspects, a first set of ports may be selected if the uplink transmission is configured as a DFT-s-OFDM signal versus sending the UL transmission as an ODFM signal. Also, a second set of ports may be selected if the uplink transmission is not configured as DFT-s-OFDM signal, i.e., an OFDM signal. In one example, if a UE selects port 10 for UL transmission, DFT-s-OFDM will be used. If the BS configures the UE to use ports 11=18, OFDM will be used.

Figure 23A:
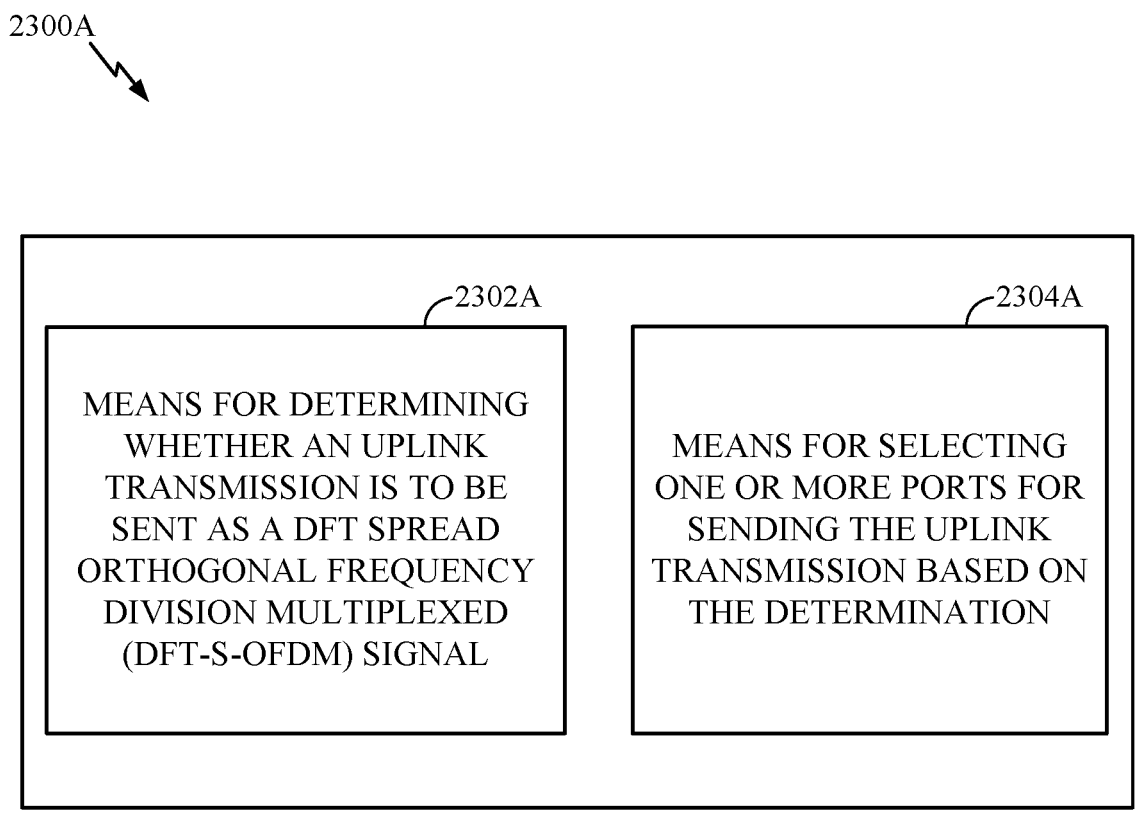
FIG. 23A shows a communication device illustrating means for performing operations for wireless communications, according to certain aspects of the present disclosure.

FIG. 23A illustrates a communications device 2300A that may include various means-plus-function components configured to perform the operations illustrated in FIG. 23. For example, at 2302A, the communications device 2300A includes means for performing the operations illustrated at 2302 in FIG. 23. Additionally, at 2304A, the communications device 2300A includes means for performing the operations illustrated at 2304 in FIG. 23.

In one or more cases, the method may further include determining a transmit power scaling factor configured by the UE, based on whether the uplink transmission is to be sent as a DFT spread orthogonal frequency division multiplex (DFT-s-OFDM) signal. According to another aspect, a first matrix may be selected if the uplink transmission is to be sent as a DFT-s-OFDM signal, and a second precoding matrix is selected if the uplink transmission is not to be sent as DFT-s-OFDM signal. According to one or more cases, elements of the first and second precoding matrix may have different amplitudes. In other cases, elements of the first and second precoding matrix may have same amplitudes, but different phases. For DFT-s-OFDM, precoding matrices are limited to CM (cubic metric) preserving matrices. In one or more cases, the uplink transmission may be sent as a DFT spread orthogonal frequency division multiplexed (DFT-s-OFDM) signal or an orthogonal frequency division multiplexed (OFDM) signal. Further, the (DFT-s-OFDM) signal may support one layer, while the (OFDM) signal may support a plurality of layers. In one or more cases, different ports may be used for SRS transmitted using a DFT-s-OFDM signal and/or CP-OFDM signal. Further, at least one of SRS transmission power, bandwidth, or cluster in frequency bands may be different depending on whether SRS is transmitted using a DFT-s-OFDM or CP-OFDM signal.

Figure 24:
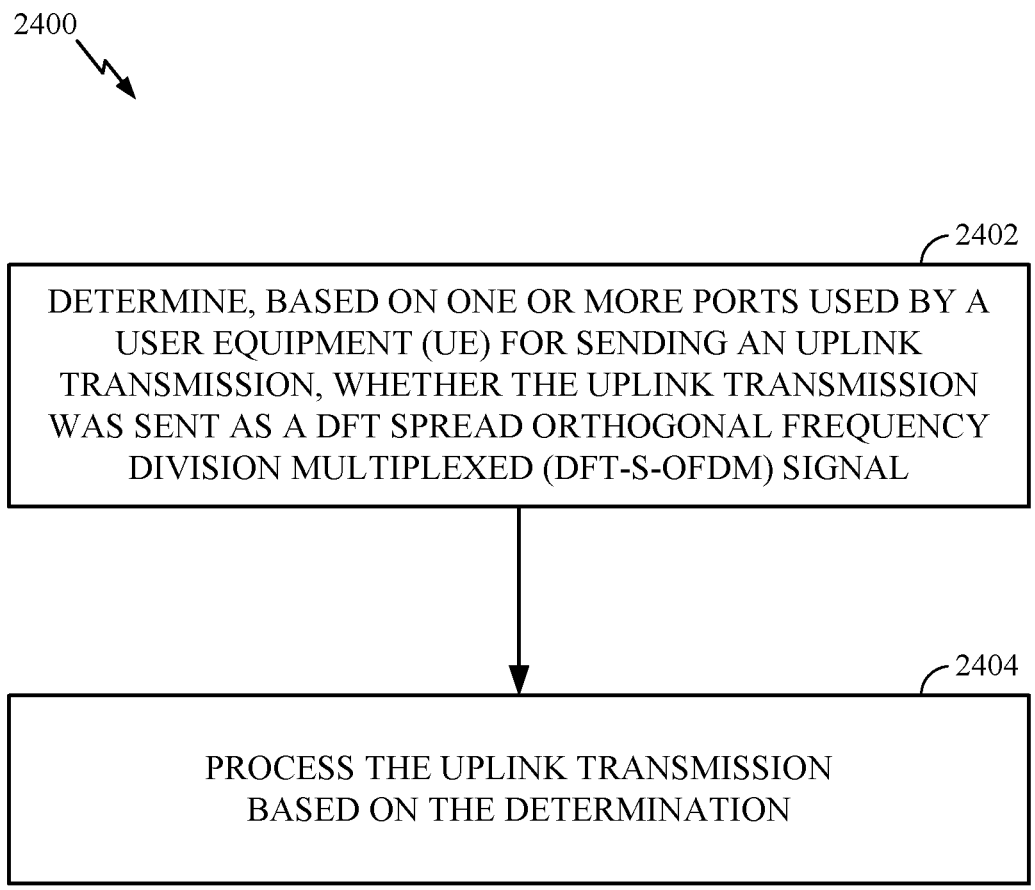
FIG. 24 illustrates example operations for wireless communications by a base station, in accordance with aspects of the present disclosure.

FIG. 24 illustrates example operations 2400 for wireless communications by a base station, in accordance with aspects of the present disclosure.

Operations 2400 begin, at block 2402, with the base station determining, based on one or more ports used by a user equipment (UE) for sending an uplink transmission, whether the uplink transmission was sent as a DFT spread orthogonal frequency division multiplexed (DFT-s-OFDM) signal. According to one or more aspects, a first set of ports may be selected by the UE if the uplink transmission is configured as a DFT-s-OFDM signal, and a second set of ports is selected by the UE if the uplink transmission is not configured as DFT-s-OFDM signal. In one or more cases, the first set of ports may be different from the second set of ports. For example, the first set of ports may include port 10 while the second set of ports may include one or more of ports 11 through 18.

Further, operations 2400 also include, at block 2404, processing the uplink transmission based on the determination.

Figure 24A:
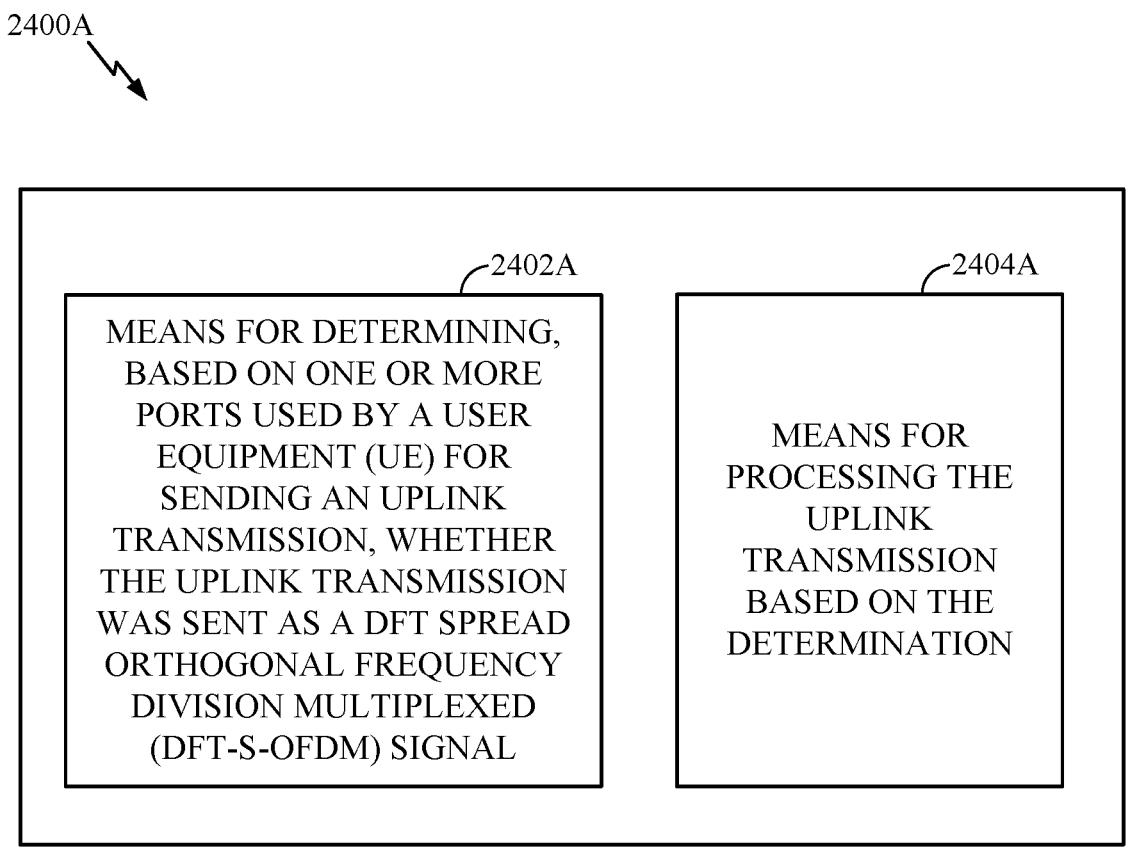
FIG. 24A shows a communication device illustrating means for performing operations for wireless communications, according to certain aspects of the present disclosure.

FIG. 24A illustrates a communications device 2400A that may include various means-plus-function components configured to perform the operations illustrated in FIG. 24. For example, at 2402A, the communications device 2400A includes means for performing the operations illustrated at 2402 in FIG. 24. Additionally, at 2404A, the communications device 2400A includes means for performing the operations illustrated at 2404 in FIG. 24.

The method may include determining a transmit power scaling factor configured by the UE, based on whether the uplink transmission is to be sent as a DFT spread orthogonal frequency division multiplexed (DFT-s-OFDM) signal. A difference between a transmit power scaling factor for the (DFT-s-OFDM) signal and the (OFDM) signal is less than a fixed amount, and the difference is configurable by the UE. In one or more cases, a first matrix is selected for the processing if the uplink transmission is sent as a DFT-s-OFDM signal, and a second matrix is selected for the processing if the uplink transmission is not sent as a DFT-s-OFDM signal. In some examples, elements of the first and second precoding matrix have different amplitudes. In some examples, elements of the first and second precoding matrix have same amplitudes, but different phases.

According to one or more examples, aspects of the present disclosure provide techniques and apparatus for distinguishing OFDM and DFT-s-OFDM by different ports (UL Data). It can be appreciated that both OFDM and DFT-s-OFDM waveforms may support uplink data transmission. However, a precoder matrix and transmission (Tx) power scaling factor, MCS for OFDM and DFT-s-OFDM may be different.

Thus, in accordance with one or more aspects of the present disclosure, different ports (layer) are assigned to OFDM and DFT-s-OFDM waveforms. By providing these different ports (layers) OFDM and DFT-s-OFDM waveforms may be distinguished. For example, Port 10 may be assigned for DFT-s-OFDM and one or more of Ports 11-18 may be assigned for OFDM. Thus, in an example, if UE selects Port 10 for UL transmission, the selection means that a DFT-s-OFDM will be used. Further, in another example, if a BS configures UE to use Port 10 for UL transmission, it means that DFT-s-OFDM will be used.

In accordance with one or more cases, Tx power scaling factors for OFDM and DFT-s-OFDM may be different by a fixed factor. For example, a OFDM power scaling factor=b may be provide, while a DFT-s-OFDM power scaling factor=b*2 may be provided that is different the OFDM power scaling factor. In one or more cases, the Tx power scaling for OFDM and DFT-s-OFDM may be independently configured by UE or gNB.

Configuring OFDM and DFT-s-OFDM port may also be provided in accordance with one or more cases. For example, a precoder for OFDM and DFT-s-OFDM may be different. In one or more cases, for an OFDM waveform, elements in a precoding matrix may have different amplitudes. For DFT-s-OFDM, elements in a precoding matrix may have the same amplitude and may only have different phases. For DFT-s-OFDM, precoding matrices may be limited to CM (cubic metric) preserving matrices.

Rank selection for OFDM and DFT-s-OFDM Ports may also be provided in accordance with one or more cases. For example, an OFDM waveform may support multi-rank/multi-layer transmission. Thus, multiple ports may be selected among multiple OFDM Ports. An DFT-s-OFDM waveform may only support 1-layer transmission. Thus, only one DFT-s-OFDM Port may exist, and may not be selected together with OFDM Ports.

Aspects of configuring OFDM and DFT-s-OFDM ports can be provided in accordance with one or more cases. For example, it is possible to assign different Ports to SRS for OFDM and SRS for DFT-s-OFDM. Particularly, making a one-to-one correspondence between Data port (OFDM/DFT-s-OFDM port) and SRS Port may be provided.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components, for example, as illustrated in FIGS. 8A, 9A, 13A, 14A, 23A, and 24A.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    determining a size for one or more precoding resource block groups (PRGs) for the UE to use for transmitting one or more sounding reference signals (SRSs), wherein:
        SRS transmission is allocated over a bandwidth including the one or more PRGs;
        each PRG of the one or more PRGs includes one or more physical resource blocks (PRBs) associated with a common precoder for that PRG;
        the size for the one or more PRGs corresponds to how many PRBs of the one or more PRBs are included within each PRG of the one or more PRGs; and
        a plurality of PRGs of the one or more PRGs span the bandwidth allocated for SRS transmission;
    precoding each PRG of the one or more PRGs with a different precoder used for transmitting the one or more SRSs within that PRG; and
    transmitting, to a base station (BS), the one or more SRSs within the one or more PRGs in accordance with the determination.

2. The method of claim 1, wherein the determination is based on signaling from the base station.

3. The method of claim 1, further comprising transmitting an indication of at least one of a recommended size for the one or more PRGs or a recommended number of layers for transmitting the one or more SRSs to the base station.

4. The method of claim 3, wherein the recommended size for the one or more PRGs or the recommended number of layers for transmitting the one or more SRSs are used for receiving one or more downlink reference signals from the BS.

5. The method of claim 1, wherein the determination is based on a number of ports used for transmitting the one or more SRSs.

6. The method of claim 1, wherein the size for the one or more PRGs corresponds to a whole operating bandwidth if a number of layers for transmitting the one or more SRSs is below a predetermined number.

7. The method of claim 1, wherein the determination is based on a power headroom of the UE.

8. The method of claim 7, wherein the size for the one or more PRGs corresponds to a whole operating bandwidth if the UE is transmitting at full power such that there is no UE power headroom available.

9. A method for wireless communications by a base station, comprising:
    determining a size for one or more precoding resource block groups (PRGs) for a user equipment (UE) to use for transmitting one or more sounding reference signals (SRSs), wherein:
        SRS transmission is allocated over a bandwidth including the one or more PRGs;
        each PRG of the one or more PRGs includes one or more physical resource block (PRBs) associated with a common precoder for that PRG;
        the size for the one or more PRGs corresponds to how many PRBs of the one or more PRBs are included within each PRG of the one or more PRGs;
        a plurality of PRGs of the one or more PRGs span the bandwidth allocated for SRS transmission; and each PRG of the one or more PRGs is precoded with a different precoder used for transmitting the one or more SRSs within that PRG; and receiving the one or more SRSs transmitted from the UE within the one or more PRGs in accordance with the determination.

10. The method of claim 9, further comprising signaling information regarding the size for the one or more PRGs to the UE.

11. The method of claim 9, further comprising receiving, from the UE, an indication of at least one of a recommended size for the one or more PRGs or a recommended number of layers for transmitting the one or more SRSs.

12. The method of claim 11, further comprising transmitting one or more downlink reference signals to the UE using the size for the one or more PRGs or the recommended number of layers for transmitting the one or more SRSs.

13. The method of claim 9, wherein the size for the one or more PRGs corresponds to a whole operating bandwidth if a number of layers for transmitting the one or more SRSs is below a predetermined number.

14. The method of claim 9, wherein the determination is based on a number of ports used for transmitting the one or more SRSs.

15. The method of claim 9, wherein the determination is based on a power headroom of the UE.

16. The method of claim 15, wherein the size for the one or more PRGs corresponds to a whole operating bandwidth if the UE is transmitting at full power such that there is no UE power headroom available.

17. The method of claim 15, wherein the size for the one or more PRGs corresponds to a subband of a whole operating bandwidth if the UE is transmitting at less than full power such that there is UE power headroom available.

18. An apparatus for wireless communications by a user equipment (UE), comprising:
at least one processor configured to:
determine a size for one or more precoding resource block groups (PRGs) for the UE to use for transmitting one or more sounding reference signals (SRSs), wherein:
SRS transmission is allocated over a bandwidth including the one or more PRGs;
each PRG of the one or more PRGs includes one or more physical resource blocks (PRBs) associated with a common precoder for that PRG;
the size for the one or more PRGs corresponds to how many PRBs of the one or more PRBs are included within each PRG of the one or more PRGs; and
a plurality of PRGs of the one or more PRGs span the bandwidth allocated for SRS transmission;
precode each PRG of the one or more PRGs with a different precoder used for transmitting the one or more SRSs within that PRG; and
transmit, to a base station (BS), the one or more SRSs within the one or more PRGs in accordance with the determination; and
a memory coupled with the at least one processor.

19. The apparatus of claim 18, wherein the determination is based on signaling from the BS.

20. The apparatus of claim 18, wherein the at least one processor is further configured to transmit an indication of at least one of a recommended size for the one or more PRGs or a recommended number of layers for transmitting the one or more SRSs to the BS.

21. The apparatus of claim 20, wherein the at least one processor is further configured to use the recommended size for the one or more PRGs or the recommended number of layers for the SRS transmission for receiving one or more downlink reference signals from the BS.

22. The apparatus of claim 20, wherein the size for the one or more PRGs corresponds to a whole operating bandwidth if a number of layers for transmitting the one or more SRSs is below a predetermined number.

23. The apparatus of claim 18, wherein the determination is based on a number of ports used for transmitting the one or more SRSs.

24. The apparatus of claim 18, wherein the determination is based on a power headroom of the UE.

25. The apparatus of claim 24, wherein the size for the one or more PRGs corresponds to a whole operating bandwidth if the UE is transmitting at full power such that there is no UE power headroom available.

26. An apparatus for wireless communications by a base station, comprising:
at least one processor configured to:
determine a size for one or more precoding resource block groups (PRGs) for a user equipment (UE) to use for transmitting one or more sounding reference signals (SRSs), wherein:
SRS transmission is allocated over a bandwidth including the one or more PRGs;
each PRG of the one or more PRGs includes one or more physical resource block (PRBs) associated with a common precoder for that PRG;
the size for the one or more PRGs corresponds to how many PRBs of the one or more PRBs are included within each PRG of the one or more PRGs;
a plurality of PRGs of the one or more PRGs span the bandwidth allocated for SRS transmission;
each PRG of the one or more PRGs is precoded with a different precoder used for transmitting the one or more SRSs within that PRG; and
receive the one or more SRSs transmitted from the UE within the one or more PRGs in accordance with the determination; and
a memory coupled with the at least one processor.

27. The apparatus of claim 26, wherein the at least one processor is further configured to signal information regarding the size for the one or more PRGs to the UE.

28. The apparatus of claim 26, wherein the at least one processor is further configured to receive, from the UE, an indication of at least one of a recommended size for the one or more PRGs or a recommended number of layers for transmitting the one or more SRSs.

29. The apparatus of claim 28, wherein the at least one processor is further configured to transmit one or more downlink reference signals to the UE using the recommended size for the one or more PRGs or the recommended number of layers for transmitting the one or more SRSs.

30. The apparatus of claim 28, wherein the size for the one or more PRGs corresponds to a whole operating bandwidth if a number of layers for transmitting the one or more SRSs is below a predetermined number.

31. The apparatus of claim 26, wherein the determination is based on a number of ports used for transmitting the one or more SRSs.

32. The apparatus of claim 26, wherein the determination is based on a power headroom of the UE.

33. The apparatus of claim 32, wherein the size for the one or more PRGs corresponds to a whole operating bandwidth if the UE is transmitting at full power such that there is no UE power headroom available.

* * * * *